United States Patent
Lee et al.

(10) Patent No.: US 12,191,903 B2
(45) Date of Patent: Jan. 7, 2025

(54) ULTRA-WIDEBAND DEVICE FOR TRANSMITTING/RECEIVING MULTIPLE PACKETS AND METHOD FOR OPERATING SAME

(71) Applicant: Samsung Electronics Co., Ltd., Gyeonggi-do (KR)

(72) Inventors: Mingyu Lee, Gyeonggi-do (KR);
Jonghoe Koo, Gyeonggi-do (KR);
Youngwan So, Gyeonggi-do (KR);
Hyunseob Oh, Gyeonggi-do (KR);
Junyoung Choi, Gyeonggi-do (KR);
Taeyoung Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 102 days.

(21) Appl. No.: 18/070,031

(22) Filed: Nov. 28, 2022

(65) Prior Publication Data
US 2023/0170933 A1 Jun. 1, 2023

(30) Foreign Application Priority Data

Nov. 26, 2021 (KR) ........................ 10-2021-0166136
Mar. 10, 2022 (KR) ........................ 10-2022-0030082

(51) Int. Cl.
*H04B 1/7183* (2011.01)
*H04B 1/7163* (2011.01)

(52) U.S. Cl.
CPC ......... *H04B 1/7183* (2013.01); *H04B 1/7163* (2013.01)

(58) Field of Classification Search
CPC .. H04B 1/7073; H04B 1/7087; H04B 1/7115; H04B 1/7156; H04B 1/7163; H04B 1/7183; G01S 13/0209; G01S 13/75; G01S 13/765; G01S 13/767
USPC ............... 375/130, 133, 141, 144, 148, 149; 370/328, 336, 345, 349, 350
See application file for complete search history.

(56) References Cited

U.S. PATENT DOCUMENTS

| | | | |
|---|---|---|---|
| 10,559,149 B1 * | 2/2020 | Kuechler | ........... G07C 9/00309 |
| 11,558,081 B1 * | 1/2023 | Padaki | ................. H04B 1/7176 |
| 2020/0014526 A1 * | 1/2020 | Hammerschmidt | ........................ H04L 25/0224 |

(Continued)

FOREIGN PATENT DOCUMENTS

| | | |
|---|---|---|
| CN | 113167879 | 7/2021 |
| KR | 10-2021-0089641 | 7/2021 |
| WO | WO 2020/145526 | 7/2020 |

OTHER PUBLICATIONS

International Search Report dated Mar. 2, 2023 issued in counterpart application No. PCT/KR2022/018905, 8 pages.

(Continued)

*Primary Examiner* — Young T. Tse
(74) *Attorney, Agent, or Firm* — The Farrell Law Firm, P.C.

(57) ABSTRACT

A method for operating a first ultra-wideband (UWB) device according to an embodiment of the disclosure may include: transmitting, in a first slot within a ranging round, a ranging control message for UWB communication; receiving a first packet transmitted by a second UWB device in a second slot within the ranging round based on the ranging control message; and receiving a second packet transmitted by a third UWB device in the second slot within the ranging round based on the ranging control message.

20 Claims, 19 Drawing Sheets

(56) References Cited

U.S. PATENT DOCUMENTS

| | | | |
|---|---|---|---|
| 2020/0150261 A1 | 5/2020 | Naguib et al. | |
| 2020/0182996 A1 | 6/2020 | Lee et al. | |
| 2020/0183000 A1 | 6/2020 | Li et al. | |
| 2020/0200862 A1 | 6/2020 | Li et al. | |
| 2020/0366335 A1* | 11/2020 | Lee | H04W 88/06 |
| 2021/0076350 A1* | 3/2021 | Yang | G01S 3/50 |
| 2021/0136556 A1 | 5/2021 | Lee et al. | |
| 2021/0373142 A1* | 12/2021 | Lim | G01S 13/343 |
| 2022/0082676 A1 | 3/2022 | Lee et al. | |

OTHER PUBLICATIONS

IEEE Std 802.15.4z™-2020 (Amendment to IEEE Std 802.15.4™-2020), Apr. 1, 2020, pp. 174.

* cited by examiner

| Octets: 2 | 0/1 | 0/2/6 | 0/1/2/6 | 0/1 | variable | variable | 2/4 |
|---|---|---|---|---|---|---|---|
| Frame Control | Sequence Number | Destination Address | Source Address | Auxiliary Security Header | Header IE (s) | Payload IE (s) | FCS |
| MAC header |||||| MAC payload | MAC footer |

FIG. 4

| Ranging Role | Ranging Slot index | Address |
|---|---|---|
| . . . | . . . | . . . |
| Responder 1 | 1 | Address of Responder 1 | → First transmission of slot 1
| Responder 2 | 1 | Address of Responder 2 | → Second transmission of slot 1
| Responder 3 | 2 | Address of Responder 3 |
| . . . | . . . | . . . |

FIG. 10B

| Ranging Role | Ranging Slot index | Address |
|---|---|---|
| ... | ... | ... |
| Responder 1 | 1 | Address of Responder 1 |
| Responder 2 | 1 | Address of Responder 2 |
| Responder 3 | 2 | Address of Responder 3 |
| ... | ... | ... |

Address of Responder 1 ➡ Code Index 3
Address of Responder 2 ➡ Code Index 4

FIG. 11B

| Ranging Role | Ranging Slot index | Address |
|---|---|---|
| ... | ... | ... |
| Responder 1 | 1 | Address of Responder 1 |
| Responder 2 | 1 | Address of Responder 2 |
| Responder 3 | 2 | Address of Responder 3 |
| ... | ... | ... |

➡ Code Index 3 (Responder 1)
➡ Code Index 4 (Responder 2)

FIG. 15B

| Ranging Role | Ranging Slot index | Address |
|---|---|---|
| ... | ... | ... |
| Responder 1 | 1 | Address of Responder 1 | ➡ STS Index 1
| Responder 2 | 1 | Address of Responder 2 | ➡ STS Index 2
| Responder 3 | 2 | Address of Responder 3 | ➡ STS Index 3
| Responder 4 | 2 | Address of Responder 4 | ➡ STS Index 4

FIG. 16B

| Index | STS |
|---|---|
| 1 | STS 1 |
| 2 | STS 2 |
| 3 | STS 3 |
| 4 | STS 4 |
| ... | ... |

FIG. 17A

| Block Index | Round Index | Slot Index | STS |
|---|---|---|---|
| 1 | 1 | 1 | STS 1-1-1 |
|   |   | 2 | STS 1-1-2 |
|   |   | ... | ... |
| 1 | 2 | 1 | STS 1-2-1 |
|   |   | 2 | ... |
| ... | ... | ... | ... |
| 100 | 5 | 7 | STS 100-5-7 |
| ... | ... | ... | ... |

FIG. 17B

| Block Index | Round Index | Slot Index | STS |
|---|---|---|---|
| 1 | 1 | 1 | STS 1-1-1-1<br>STS 1-1-1-2<br>... |
|   |   | 2 | STS 1-1-2-1<br>STS 1-1-2-2<br>... |
|   |   | ... | ... |
| 1 | 2 | 1 | STS 1-2-1-1<br>STS 1-2-1-2<br>... |
|   |   | 2 | ... |
| ... | ... | ... | ... |
| 100 | 5 | 7 | STS 100-5-7-1<br>STS 100-5-7-2<br>... |
| ... | ... | ... | ... |

FIG. 17C

ULTRA-WIDEBAND DEVICE FOR TRANSMITTING/RECEIVING MULTIPLE PACKETS AND METHOD FOR OPERATING SAME

CROSS REFERENCE TO RELATED APPLICATION(S)

This application is based on and claims priority under 35 U.S.C. 119(a) to Korean Patent Application Nos. 10-2021-0166136 and 10-2022-0030082, filed on Nov. 26, 2021 and Mar. 10, 2022, respectively, in the Korean Intellectual Property Office, the disclosures of which are incorporated herein by reference in their entirety.

BACKGROUND

1. Field

The disclosure relates generally to ultra-wideband (UWB) communication and, more particularly, to a UWB device for transmitting/receiving multiple packets and a method for operating the same.

2. Description of Related Art

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

With the advance of wireless communication systems as described above, various services can be provided, and accordingly there is a need for schemes to effectively provide these services. For example, a ranging technology for measuring the distance between electronic devices by using an UWB may be used.

SUMMARY

The disclosure provides a method in which, when a UWB device receives UWB packets from multiple other UWB devices, power consumption can be reduced.

According to an aspect, a method is provided for operating a first UWB device. A ranging control message for UWB communication is transmitted in a first slot within a ranging round. A first packet is received from a second UWB device in a second slot within the ranging round, based on the ranging control message. A second packet is received from a third UWB device in the second slot within the ranging round, based on the ranging control message.

According to an aspect, a method is provided for operating a second UWB device. A ranging control message for UWB communication is received from a first UWB device in a first slot within a ranging round. A first packet is transmitted in a second slot within the ranging round, based on the ranging control message. A second packet is transmitted by a third UWB device in the second slot within the ranging round based on the ranging control message.

According to an aspect, a first UWB device is provided that includes a transceiver and a controller coupled with the transceiver. The controller is configured to control the transceiver to transmit a ranging control message for UWB communication in a first slot within a ranging round, receive a first packet from a second UWB device in a second slot within the ranging round based on the ranging control message, and receive a second packet from a third UWB device in the second slot within the ranging round based on the ranging control message.

Accordingly to an aspect, a second UWB device is provided that includes a transceiver and a controller coupled with the transceiver. The controller is configured to control the transceiver to receive a ranging control message for UWB communication in a first slot within a ranging round from a first UWB device, and transmit a first packet in a second slot within the ranging round, based on the ranging control message. A second packet is transmitted by a third UWB device, based on the ranging control message, in the second slot within the ranging round.

BRIEF DESCRIPTION OF THE DRAWINGS

The above and other aspects, features, and advantages of the disclosure will be more apparent from the following detailed description when taken in conjunction with the accompanying drawings, in which:

FIG. 4 illustrates the structure of a UWB medium access control (MAC) frame, according to an embodiment of the disclosure;

FIG. 10B illustrates a ranging device management (RDM) list field inside an RDM information element (IE), according to an embodiment of the disclosure;

FIG. 11B illustrates an RDM list field inside an RDM IE according to an embodiment of the disclosure;

FIG. 15B illustrates an RDM list field inside an RDM IE, according to an embodiment of the disclosure;

FIG. 16B illustrates an RDM list field inside an RDM IE, according to an embodiment of the disclosure;

FIG. 17A illustrates a scrambled timestamp sequence (STS) set generated according to an embodiment of the disclosure;

FIG. 17B illustrates an STS set generated according to an embodiment of the disclosure;

FIG. 17C illustrates an STS set generated according to an embodiment of the disclosure.

DETAILED DESCRIPTION

Figure 1:
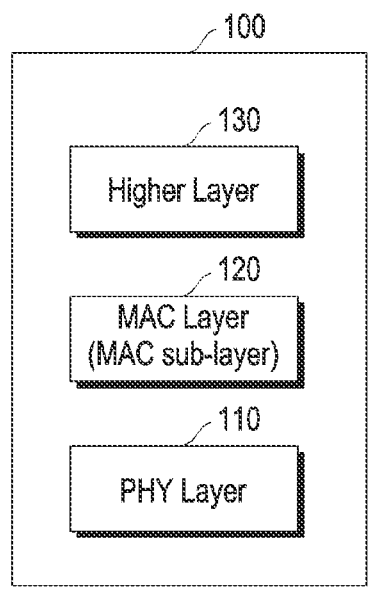
FIG. 1 illustrates an architecture of an electronic device, according to an embodiment of the disclosure.

Hereinafter, embodiments of the disclosure are described in detail with reference to the accompanying drawings. The same or similar components may be designated by similar reference numerals although they are illustrated in different drawings. Detailed descriptions of constructions or processes known in the art may be omitted to avoid obscuring the subject matter of the disclosure.

In the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. The unit may be constructed either to be stored in an addressable storage medium or to execute one or more processors. Therefore, the unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. Moreover, the elements and units may be implemented to reproduce one or more central processing units (CPUs) within a device or a security multimedia card. Further, the unit may include one or more processors.

As used herein, the term "terminal" or "device" may also be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various examples of the terminal may include a cellular phone, a smartphone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback home appliance having a wireless communication function, an Internet hole appliance capable of wireless Internet access and browsing, and portable units or terminals having integrated combinations of these functions. Further, the terminal may include an M2M terminal and an MTC terminal/device, but is not limited thereto. Herein, the terminal may also be referred to as an electronic device or simply as a device.

The terms which will be described below are terms defined in consideration of the functions in the disclosure, and may be different according to users, intentions of the users, or customs. Therefore, the definitions of the terms should be made based on the contents throughout the specification.

Herein, a communication using a UWB will be described by way of example, but the embodiments of the disclosure may be applied to other communication systems having similar technical backgrounds or characteristics. Examples of such communication systems may include communication systems using Bluetooth™ or Zigbee™, etc. Therefore, based on determinations by those skilled in the art, the embodiments of the disclosure may be applied to other communication systems through some modifications without significantly departing from the scope of the disclosure.

In general, wireless sensor network technologies are largely divided, according to the recognition distance, into wireless local area network (WLAN) technologies and wireless personal area network (WPAN) technologies. The WLAN technologies are based on IEEE 802.11 and enable access to a backbone network within a radius of about 100 meters (m). The WPAN technologies are based on IEEE 802.15 and include Bluetooth™, ZigBee™, and UWB. A wireless network implemented by such wireless network technology may include multiple electronic devices.

According to definitions by the Federal Communications Commission (FCC), UWB may refer to wireless communication technology which uses a bandwidth of 500 megahertz (MHz) or higher, or the bandwidth of which corresponding to the center frequency is 20% or higher. The UWB may refer to the bandwidth itself to which UWB communication is applied. UWB enables secure and accurate ranging between devices. UWB thereby enables relative position estimation based on the distance between two devices or accurate position estimation based on distances from fixed devices (having known positions).

Specific terms used in the following description are provided to help understanding of the disclosure, and use of such specific terms may be changed to other forms without deviating from the technical idea of the disclosure.

An application dedicated file (ADF) may be a data structure inside an application data structure capable of hosting an application or application specific data, for example.

An application protocol data unit (APDU) may be a command and a response used when communicating with an application data structure inside a UWB device.

Application specific data may be a file structure having an application level and a root level including UWB session data and UWB controller information necessary for a UWB session, for example.

A controller may refer to a ranging device configured to define and control ranging control messages (RCMs) (or control messages).

A controllee may refer to a ranging device configured to use a ranging parameter inside an RCM (or control messages) received from a controller.

A dynamic STS mode may refer to an operation mode in which the STS is not repeated during a ranging session, unlike static STS. In this mode, the STS may be managed by a ranging device, and a ranging session key that generates the STS may be managed by a secure component.

An applet may refer to an applet executed in a secure component including service data and UWB parameters, for example. Herein, an applet may be a fine ranging (FiRa) applet.

A ranging device may be a device capable of performing UWB ranging. Herein, a ranging device may be an enhanced ranging device (ERDEV) defined by IEEE 802.15.4z or a FiRa device defined by FiRa. The ranging device may be referred to as a UWB device.

A UWB-enabled application may refer to an application for a UWB service. For example, the UWB-enabled application may be an application using a framework application programming interface (API) for configuring an out-of-band (OOB) connector, a secure service, and/or a UWB service, for a UWB session. Herein, a UWB-enabled application may be referred to as an application or a UWB application. The UWB-enabled application may be a FiRa-enabled application defined by FiRa.

A framework may refer to a component configured to provide access to a profile, individual UWB configurations, and/or notifications. For example, the framework may be a collection of logical software components including a profile manager, an OOB connector, a secure service, and/or a UWB service. Herein, a framework may be a FiRa framework defined by FiRa.

An OOB connector may refer to a software component for configuring OOB connection (e.g., a Bluetooth™ low energy (BLE) connection) between ranging devices. Herein, an OOB connector may be a FiRa GOB connector defined by FiRa.

A profile may refer to a predefined set of UWB and OOB configuration parameters. Herein, a profile may be a FiRa profile defined by FiRa.

A profile manager may refer to a software component configured to implement a profile that can be used by a ranging device. Herein, a profile manager may be a FiRa profile manager defined by FiRa.

A service may be an implementation of a use case that provides a service to an end-user.

A smart ranging device may refer to a ranging device capable of implementing an optional framework API. Herein, a smart ranging device may be a FiRa smart device defined by FiRa.

A global dedicated file (GDF) may refer to a root level of application specific data including data necessary to configure a USB session.

A frame API may refer to an API used by a UWB-enabled application to communicate with a framework.

An initiator may refer to a ranging device configured to initiate ranging exchange.

An object identifier (OID) may refer to an identifier of an ADF inside an application data structure.

GOB may refer to data communication which is an underlying wireless technology, and which does not use UWB.

A ranging data set (RDS) may refer to data (e.g., a UWB session key, a session ID, or the like) necessary to configure a UWB session, the confidentiality, authenticity, and integrity of which need to be protected.

A responder may refer to a ranging device configured to respond to an initiator in connection with ranging exchange.

STS may refer to a ciphered sequence for increasing the integrity and accuracy of ranging measurement timestamps. The STS may be generated from a ranging session key.

A secure channel may refer to a data channel for preventing overheating and tampering.

A secure component may refer to an entity (e.g., secure element (SE) or trusted execution environment (TEE)) having a security level defined to interface with a UWB subsystem (UWBS) for the purpose of providing an RDS to the UWBS when a dynamic STS is used, for example.

An SE may refer to a tamper-resistant secure hardware component which may be used as a secure component inside a ranging device.

Secure ranging may refer to ranging based on an STS generated through a strong ciphering operation.

A secure service may refer to a software component for interfacing with a secure component such as a secure element or a TEE.

A service applet may refer to an applet related to a secure component handling a service specific transaction.

A service data may refer to data provided to a service provider who needs to transfer the same between two ranging devices in order to implement a service.

A service provider may refer to an entity configured to define and provide hardware and software necessary to provide a specific service to an end-user.

A static STS mode refers to an operation mode in which an STS is repeated during a session, and is not necessarily managed by a secure component.

A secure UWB service (SUS) applet may refer to an applet related to an SE communicating with an applet in order to search for data necessary to enable a secure UWB session with another ranging device. In addition, the SUS applet may transfer corresponding data (information) to a UWBS.

A UWB service may refer to a software component configured to provide access to a UWBS.

A UWB session may refer to a period of time between when a controller and a controllee start communication through a UWB and when they stop the communication. The UWB session may include ranging, data transfer, or both ranging/data transfer.

A UWB session ID may refer to an ID (e.g., a 32-bit integer) for identifying a UWB session, shared between a controller and a controllee.

A UWB session key may refer to a key used to protect a UWB session. The UWB session key may be used to generate an STS. Herein, a UWB session key may be a UWB ranging session key (URSK), and may be simply referred to as a session key.

A UWBS may refer to a hardware component configured to implement a UWB PHY and a MAC layer. The UWBS may have an interface regarding a framework and an interface regarding a secure component for searching for an RDS. Herein, the UWB PHY and the MAC spec may be a FiRa PHY and a FiRa MAC spec defined by FiRa with reference to IEEE 802.15.4/4z, for example.

One-way ranging (OWR) may refer to a ranging scheme using a time difference of arrival (TDoA) localization method. The TDoA method locates a mobile device, based on the relative time of arrival or a single message or multiple messages. Descriptions in IEEE 802.15.4z may be referred to for descriptions of OWR (TDoA). Examples of the OWR scheme may include a downlink (DL)-TDoA (DT) scheme.

DT may refer to a localization method that uses TDoA measurements from multiple DT-anchors. DT-anchors may exchange a DT message (DTM) (ranging message) with each other, and a DT-tag may passively receive the DTM. Respective DT-tags receiving DTMs may calculate the TDoA by using at least one of reception timestamps of respective DTMs, transmission timestamps of DTMs included in corresponding DTMs, or the reply time included in DTMs. The DT-tag may estimate its position by using at least one of calculated TDoA or coordinates of DT-anchors.

Two-ray ranging (TWR) may refer to a ranging scheme in which the relative distance between two devices can be estimated by measuring the time of flight (ToF) through exchange of a ranging message between the two devices. The TWR scheme may be one of double-sided two-way ranging (DS-TWR) and single-sided two-way ranging (SS-TWR). The SS-TWR may correspond to a procedure in which ranging is performed through a single round-trip time measurement. The DS-TWR may correspond to a procedure in which ranging is performed through two round-trip time measurements. Descriptions in IEEE 802.15.4z may be referred to for descriptions of SS-TWR and DS-TWR.

A UWB message may refer to a message including a payload IE transmitted by a UWB device (e.g., ERDEV).

A ranging message may refer to a message transmitted by a UWB device (e.g., ERDEV) in a UWB ranging procedure. For example, the ranging message may be a message transmitted by a UWB device (e.g., ERDEV) in a specific phase of a ranging round, such as a ranging initiation message (RIM), a ranging response message (RRM), a ranging final message (RFM), or a measurement report message (MRM). The ranging message may include at least one UWB message. If necessary, multiple ranging messages may be combined into a single message. For example, in the case of non-deferred DS-TWR ranging, an RFM and an MRM may be combined ingo a single message in the ranging final phase.

A UWB channel may be one of candidate UWB channels allocated for UWB communication. The candidate UWB channels allocated for UWB communication may be channels allocated for UWB communication defined by IEEE 802.15.4/4z. The UWB channel may be used for UWB ranging and/or transaction. For example, the UWB channel may be used to transmit/receive a ranging frame (RFRAME) and/or to transmit/receive a data frame.

A narrowband (NB) channel may refer to a channel having a narrower bandwidth than a UWB channel. The NB channel may be a subchannel of one of candidate UWB channels allocated for UWB communication. The candidate UWB channels allocated for UWB communication may be channels allocated for UWB communication defined by IEEE 802.15.4/4z. The NB channel may be used for a connection configuration for advertising, device discovery, and/or additional parameter negotiation/authentication. For example, the NB channel may be used to transmit/receive an advertisement message, an additional advertising message, a connection request message, and/or a connection confirmation message.

Hereinafter, various embodiments of the disclosure will be described with reference to the accompanying drawings.

FIG. 1 illustrates an architecture of an electronic device, according to an embodiment of the disclosure.

Herein, the electronic device may be one of various types of electronic devices. For example, the electronic device may be a portable device (e.g., UE, smartphone, wearable device, vehicle, tag device) or a stationary device (e.g., door lock, anchor device, or the like).

Referring to FIG. 1, an electronic device 100 may include a PHY layer 110, a MAC layer (MAC sublayer) 120, and/or a higher layer 130.

(1) PHY Layer

The PHY layer 110 may include a low-level control entity and at least one transceiver. Herein, the transceiver may be referred to as an RF transceiver or a radio transceiver.

The at least one transceiver may include a first transceiver supporting UWB communication (e.g., UWB communication based on 802.15.4z), a second transceiver supporting NB communication using a narrower bandwidth than the bandwidth of the UWB communication, and/or a third transceiver supporting a different communication technology (for example, Bluetooth™, BLE, or the like). Herein, the first transceiver may be referred to as a UWB transceiver, the second transceiver may be referred to as an NB transceiver, and the third transceiver may be referred to as an GOB transceiver. A single transceiver may support multiple communication technologies. For example, a single transceiver may support UWB communication and NB communication.

The PHY layer 110 may support at least one of the following functions:
  transceiver activation and deactivation function (transceiver on/off function)
  energy detection function
  channel selection function
  clear channel assessment (CCA) function
  synchronization function
  low-level signaling function
  UWB ranging, positioning, and localization function
  spectrum resource management function
  function of transmitting/receiving packets through a physical medium
(2) MAC Layer The MAC layer 120 provides an interface between the higher layer 130 and the PHY layer 120.

The MAC layer 120 may provide two services as follows:
  MAC data service: a service for enabling a MAC protocol data unit (PDU) to be transmitted/received through the PHY
  MAC management service: a service for interfacing to a MAC sublayer management entity (MLME) service access point (SAP) (MLME-SAP)

The MAC layer 120 may support at least one of the following functions:
  device discovery and connection configuration function
  channel access function (a function for accessing a physical channel (for example, NB channel/UWB channel/OOB channel))
  synchronization function
  energy detection-based interference alleviation function
  NB signaling-related function
  guaranteed timeslot (GTS) management function
  frame delivery function
  UWB ranging function
  PHY parameter change notification function
  security function
(3) Higher Layer The higher layer 130 may include a network layer configured to provide functions such as network configuration and message routing and/or an application layer configured to provide an intended function of the device. The application layer may be a UWB-enabled application layer for providing a UWB service.

Figure 2:
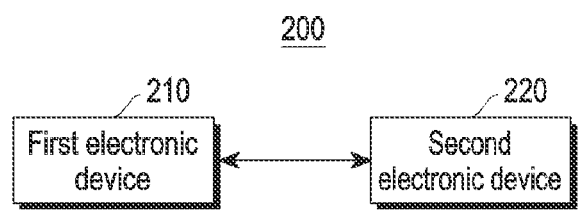
FIG. 2 illustrates a communication system including multiple electronic devices, according to an embodiment of the disclosure.

FIG. 2 illustrates a communication system including multiple electronic devices, according to an embodiment of the disclosure.

Referring to FIG. 2, a communication system 200 may include a first electronic device 210 and a second electronic device 220. The first electronic device 210 and/or the second electronic device 220 may be the electronic device 100 in FIG. 1.

The first electronic device 210 may communicate with the second electronic device 220 for device discovery, connection configuration, ranging (for example, UWB ranging), data communication, and/or other purposes.

The first electronic device 210 may communicate with the second electronic device 220 by using a preconfigured communication scheme (technology). For example, the first electronic device 210 may perform wireless communication with the second electronic device 220 by using a UWB communication scheme, an NB communication scheme, and/or an GOB communication scheme.

Herein, according to the UWB communication scheme, communication may be performed by using at least one of candidate UWB channels allocated for UWB communication. An example of candidate UWB channels allocated for UWB communication is provided in Table 1 below:

TABLE 1

| Band group[a] (decimal) | Channel number (decimal) | Center frequency, $f_c$ (MHz) | Band width (MHz) | Mandatory/ Optional |
|---|---|---|---|---|
| 0 | 0 | 499.2 | 499.2 | Mandatory below 1 GHz |
| 1 | 1 | 3494.4 | 499.2 | Optional |
|   | 2 | 3993.6 | 499.2 | Optional |
|   | 3 | 4492.8 | 499.2 | Mandatory in low band |
|   | 4 | 3991.6 | 1331.2 | Optional |
| 2 | 5 | 6489.6 | 499.2 | Optional |
|   | 6 | 6988.8 | 499.2 | Optional |
|   | 7 | 6489.6 | 1081.6 | Optional |
|   | 8 | 7488.0 | 499.2 | Optional |
|   | 9 | 7987.2 | 499.2 | Mandatory in high band |
|   | 10 | 8486.4 | 499.2 | Optional |
|   | 11 | 7987.2 | 1331.2 | Optional |
|   | 12 | 8985.6 | 499.2 | Optional |
|   | 13 | 9484.8 | 499.2 | Optional |
|   | 14 | 9984.0 | 499.2 | Optional |
|   | 15 | 9484.8 | 1354.97 | Optional |

[a]Note that bands indicate a sequence of adjacent HRP UWB center frequencies: band 0 is the sub-gigahertz channel, band 1 has the low-band HRP UWB channels, and band 2 has the high-band channels.

Herein, at least one of the channels in Table 1 may be allocated as a UWB channel supported by UWB transceivers 130b and 230b. For example, channel number 5 and/or 9 in Table 1 may be allocated as UWB channels.

NB communication may support at least one NB channel having a narrower bandwidth than UWB channel.

The NB channel may be a subchannel among candidate UWB channels allocated for UWB communication. As described, an example of candidate UWB channels allocated for UWB communication is given in Table 1 above.

As shown in Table 1, candidate UWB channels mainly have a bandwidth of 500 MHz or higher. Therefore, this is disadvantageous to power spectral density (energy detection) if used as it is, and it may be necessary to divide the corresponding channel into multiple subchannels (NB channels), which may then be used. For example, it may be necessary to use an NB channel for device discovery (or advertisement) and/or connection configuration.

Figure 3:
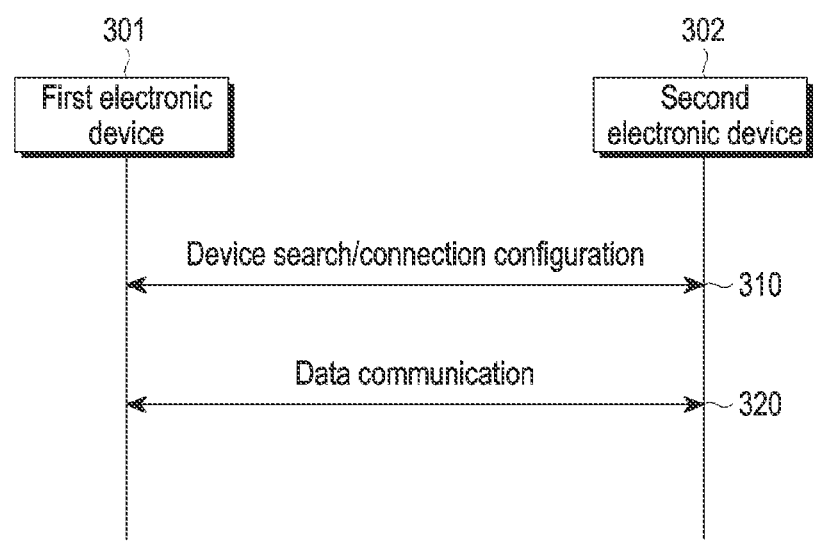
FIG. 3 illustrates a method in which multiple electronic devices perform communication, according to an embodiment of the disclosure.

FIG. 3 illustrates a method in which multiple electronic devices perform communication, according to an embodiment of the disclosure.

A first electronic device 301 and a second electronic device 302 in FIG. 3 may be, for example, the electronic device in FIG. 1 or FIG. 2.

Referring to FIG. 3, the first electronic device 301 and the second electronic device 302 may perform a device search/connection configuration procedure 310 and a data communication procedure 320. The device search/connection configuration procedure 310 and the data communication procedure 320 may be managed or controlled by the MAC layer (entity) of the electronic device.

(1) Device Search/Connection Configuration Procedure

Herein, the device search/connection configuration procedure 310 may be a preliminary procedure performed before the data communication procedure 320. The device search/connection configuration procedure 310 may be performed through OOB communication (channel), NB communication (channel), and/or UWB communication (channel).

The device search/connection configuration procedure 310 may include at least one of the following operations:

device search operation: an operation in which an electronic device searches for (discovering) another UWB device. The device search operation may include an operation of transmitting/receiving an advertisement message. Herein, the device search operation may be referred to as a discovery operation or an advertising operation.

connection configuration operation: an operation in which two electronic devices configure a connection. The connection configuration operation may include an operation of transmitting/receiving a connection request message and a connection confirmation message. Connection (channel) used for the connection configuration operation may be used to configure and control a UWB session for data communication. For example, through a secure channel configured through the connection configuration operation, parameters for configuring a UWB session (e.g., UWB performance parameter (controllee performance parameter), UWB configuration parameter, session key-related parameter) may be negotiated between two electronic devices.

(2) Data Communication Procedure

Herein, the data communication procedure 320 may be a procedure in which data is transmitted/received by using UWB communication. The data communication procedure may be performed by using UWB communication or NB communication.

The data communication procedure 320 may include at least one of the following operations:

UWB ranging operation: an operation in which an electronic device performs UWB ranging with another electronic device according to a preconfigured UWB ranging scheme (e.g., OWR, SS-TWR, DS-TWR scheme). The UWB ranging operation may include a ToF measurement operation and/or an angle of arrival (AoA) measurement operation.

transaction operation: an operation in which an electronic device exchanges service data with another electronic device.

FIG. 4 illustrates the structure of a UWB MAC frame, according to an embodiment of the disclosure.

The UWB MAC frame may follow the MAC frame structure according to IEEE 802.15.4z, for example. Herein, the UWB MAC frame may be simply referred to as a MAC frame or a frame. The UWB MAC frame may be used to transfer UWB data (e.g., UWB message, ranging message, control information, service data, application data, transaction data, and the like).

Referring to FIG. 4, the UWB MAC frame may include a MAC header (MHR), a MAC payload, and/or a MAC footer (MFR).

(1) MAC Header

The MAC header may include a frame control field, a sequence number field, a destination address field, a source address field, an auxiliary security header field, and/or at least one header IE field. Some fields may not be included in the MAC header.

The frame control field may include a frame type field, a security enabled field, a frame pending field, an AR field, a PAN ID compression field, a sequence number suppression field, an IE present field, a destination addressing mode field, a frame version field, and/or a source addressing mode field. Each field will now be described.

The frame type field may indicate the type of frame. The type of a frame may include a data type and/or a multipurpose type.

The security enabled field may indicate whether an auxiliary security header field exists. The auxiliary security header field may include information necessary for security processing.

The frame pending field may indicate whether a device that transmits a frame has more data for the recipient. That is, the frame pending field may inform whether there is a pending frame for the recipient.

The AR field may indicate whether an acknowledgement regarding frame reception is requested by the recipient.

The PAN ID compression field may indicate whether a PAN ID field exists.

The sequence number suppression field may indicate whether a sequence number field exists. The sequence number field may indicate a sequence identifier related to a frame.

The IE present field may indicate whether a header IE field and a payload IE field are included in a frame.

The destination addressing mode field may indicate whether a destination address field includes a short address (e.g., 16 bits) or an extended address (e.g., 64 bits). The destination address field may indicate the address of a frame recipient.

The frame version field may indicate the version of a frame. For example, the frame version field may be configured to have a value indicating IEEE std 802.15.4z-2020.

The source addressing mode field may indicate whether a source address field exists and, when the source address field exists, may indicate whether the source address field includes a short address (e.g., 16 bits) or an extended address (e.g., 64 bits). The source address field may indicate the address of a frame originator.

(2) MAC Payload

The MAC payload may include at least one payload IE field. The payload IE field may include a vendor specific nested IE. The payload IE field may include a payload IE field of a UWB message or a control message.

(3) MAC Footer

The MAC footer may include an FCS field. The FCS field may include a 16-bit CRC or a 32-bit CRC.

Figure 5A:
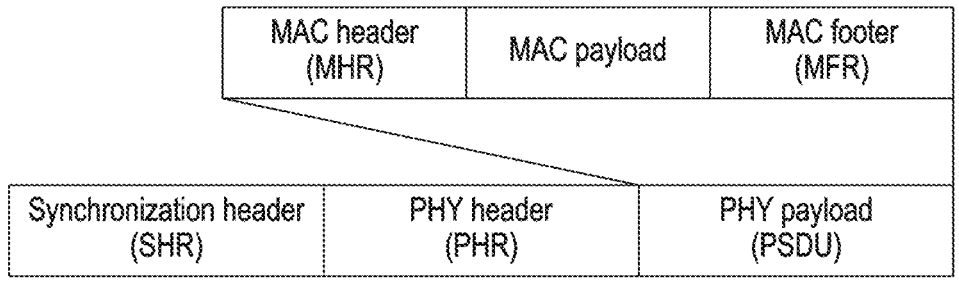
FIGS. 5A and 5B illustrate a UWB physical (PHY) packet, according to an embodiment of the disclosure.
Figure 5B:
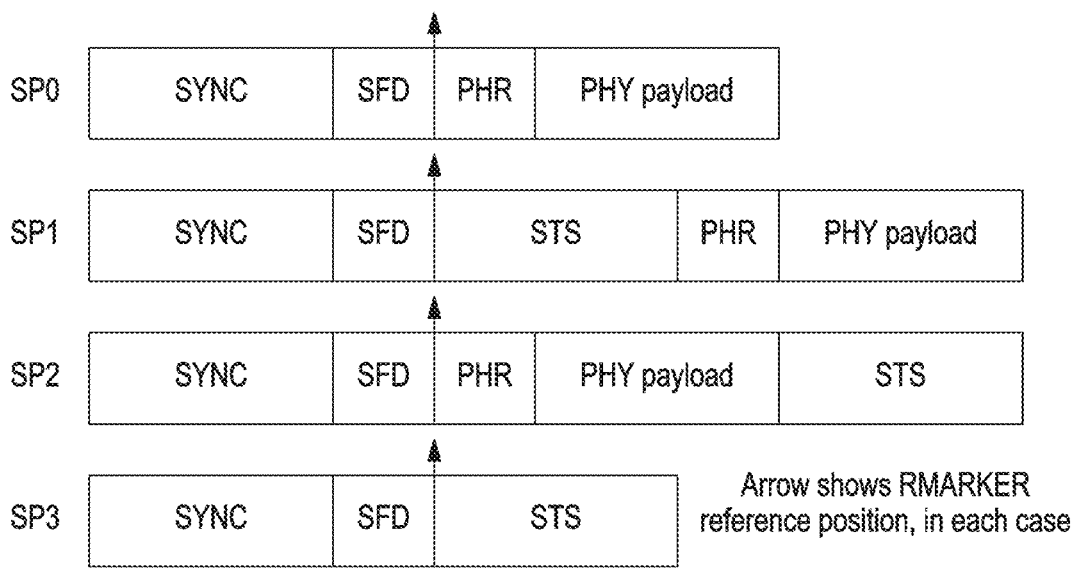

FIGS. 5A and 5B illustrate a UWB PHY packet, according to an embodiment of the disclosure.

More specifically, in FIG. 5A, a structure of a UWB PHY packet having no STS packet configuration applied thereto is illustrated. In FIG. 5B a structure of a UWB PHY packet having an STS packet configuration applied thereto is illustrated. Herein, a UWB PHY packet may be referred to as a PHY packet, a PHY PDU (PPDU), or a frame.

Referring to FIG. 5A, the PPDU may include a synchronization header (SHR), a PHY header (PHR), and a PHY payload (PSDU). The PSDU may include a MAC frame and, as in FIG. 4, the MAC frame may include a MAC header (MHR), a MAC payload, and/or a MAC footer (MFR). Herein, the synchronization header part may be referred to as a preamble, and the part including the PHY header and the PHY payload may be referred to as a data part.

The synchronization header is used for synchronization for signal reception, and may include a SYNC field and a start-of-frame delimiter (SFD) field.

The SYNC field may be a field including multiple preamble symbols used for synchronization between transmitting/receiving devices. The preamble symbols may be configured through one of predefined preamble codes.

The SFD field may be a field indicating the end of an SHR and the start of a data field.

The PHY header may provide information regarding the configuration of the PHY payload. For example, the PHY header may include information regarding the length of the PSDU, information indicating whether the current frame is an RFRAME, and the like.

The PHY layer of the UWB device may include an optional mode for providing a reduced on-air time for a high-density/low-power operation. In this case, the UWB PHY packet may include a ciphered sequence (e.g., STS) for increasing the integrity and accuracy of a ranging measurement timestamp. The STS may be included in the STS field of the UWB PHY packet, and may be used for secure ranging.

Referring to FIG. 5B, when the STS packet (SP) configuration is 0 (SP0), the STS field is not included in the PPDU (SP0 packet). When the SP configuration is 1 (SP1), the STS field is positioned immediately behind the start of frame delimiter (SFD) field and in front of the PHR field (SP1 packet). When the SP configuration is 2 (SP2), the STS field is positioned behind the PHY payload (SP2 packet). When the SP configuration is 3 (SP3), the STS field is positioned immediately behind the SFD field, and the PPDU does not include the PHR and the data field (PHY payload) (SP3 packet). That is, in the case of SP3, the PPDU does not include the PHR and the PHY payload.

According to the embodiment in FIG. 5B, each UWB PHY packet may include an RMARKER for defining a reference time, and the RMARKER may be used to acquire a ranging message (frame) transmission time, reception time, and/or time interval in a UWB ranging procedure.

Figure 6:
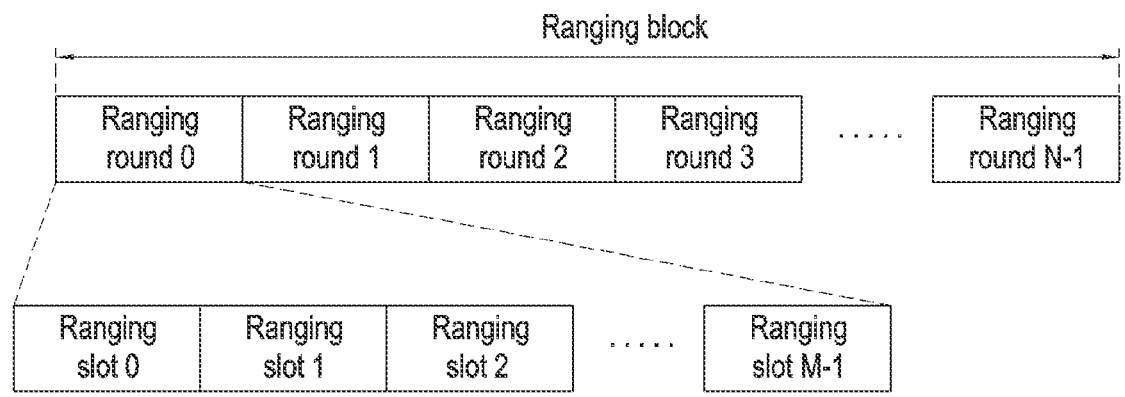
FIG. 6 illustrates a structure of a ranging block and ranging rounds used for UWB ranging, according to an embodiment of the disclosure.

FIG. 6 illustrates a structure of a ranging block and ranging rounds used for UWB ranging, according to an embodiment of the disclosure.

Herein, a ranging block refers to a time period for ranging. A ranging round may be a period of sufficient duration to complete an entire range-measurement cycle (ranging cycle) handled by a set of UWB devices participating in ranging exchange. A ranging slot may be a period of sufficient duration to transmit at least one ranging frame (RFRAME) (e.g., ranging initiation/response/final message or the like).

As in FIG. 6, a ranging block may include at least one ranging round, and each ranging round may include at least one ranging slot.

When the ranging mode is a block-based mode, the mean time between consecutive rounds may be a constant. Alternatively, when the ranging mode is an interval-based mode, the time between consecutive ranging rounds may dynamically change. That is, the interval-based mode may adopt a time structure having an adaptive spacing.

The number of slots included in a ranging round and the duration thereof may change between ranging rounds.

Herein, a ranging block, a ranging round, and a ranging slot may be simply referred to as a block, a round, and a slot, respectively.

Figure 7:
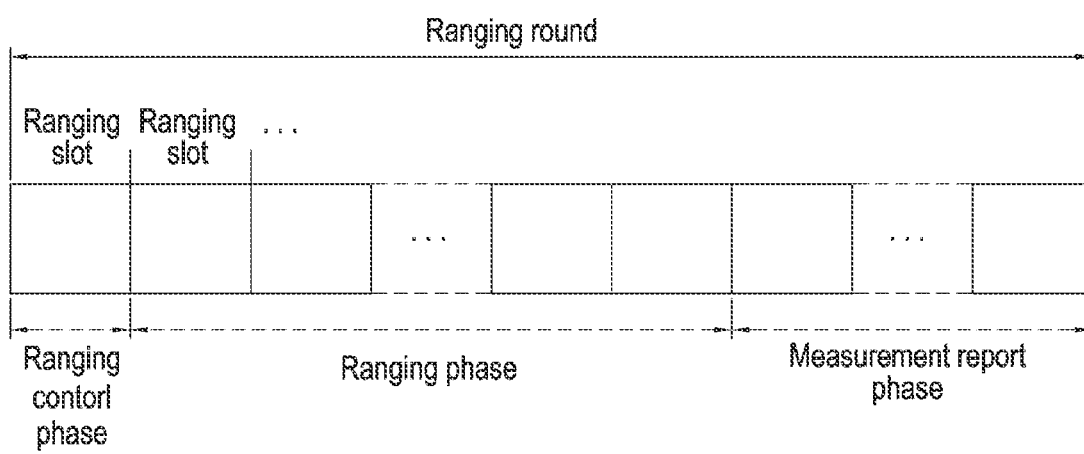
FIG. 7 illustrates a structure of a ranging round used for UWB ranging, according to an embodiment of the disclosure.

FIG. 7 illustrates a structure of a ranging round used for UWB ranging, according to an embodiment of the disclosure.

As shown in FIG. 7, a ranging round may include multiple ranging slots. Within the ranging round, a ranging control phase (RCP), a ranging phase (RP), and a measurement report phase (MRP) may be performed.

The RCP may be a phase in which a controller transmits a ranging control message (RCMP) within the ranging round. The RCM may be a message transmitted by the controller in the first slot (e.g., slot 0) of the ranging round in order to construct a ranging parameter. The RP may be phase in which a message for UWB ranging is transmitted/received within the ranging round. The RP may include at least one of a ranging initiation phase (RIP), a ranging response phase (RRP), and a ranging final phase (RFP).

The RIP may be a phase in which at least one initiator transmits at least one ranging initiation message. The RRP may be a phase in which at least one responder transmits at least one response message to the initiator. The RFP may be a phase in which the initiator transmits at least one ranging final message to at least one responder.

The MRP may be a phase in which ranging measurement and relevant service information is exchanged within the ranging round.

The RCP may be performed in the first ranging slot within the ranging round. The ranging control phase may be performed in at least one ranging slot.

The RP may be performed in ranging slots which range from the second ranging slot to the Kth (K is a natural number equal to or larger than 3) ranging slot within the ranging round. The ranging phase may be performed in at least one ranging slot.

The MRP may be performed in ranging slots which range from the $(K+1)^{th}$ ranging slot to the Lth (L is a natural number equal to or larger than 5) ranging slot within the ranging round. The measurement report phase may be performed in at least one ranging slot.

A UWB device configured to perform UWB ranging may occupy at least one ranging slot so as to transmit a UWB packet. Ranging slot allocation information may be included in a RCM transmitted in the RCP.

In order to secure the packet processing time and to avoid interference, the length of a ranging slot may be implemented to be larger than the packet length. The transmission timepoint within the ranging slot is basically the slot start timepoint, but the transmission timepoint within the ranging slot may be adjusted through an offset.

The RCM transmitted in the RCP may include a ranging round (RR) IE. The RCM including the RR IE may be transmitted in the starting part of a ranging slot within the first ranging round of ranging message exchange.

The RR IE may be used to signal ranging round information. The RR IE may include information regarding the current ranging round (for example, ranging round in current ranging block i) and/or the next ranging round (for example, ranging round in next ranging block i+1). The RR IE may be configured in a content field format as in Table 2. For example, the RR IE may include a ranging block index, a hopping mode field, a round index field, and a transmission offset field.

TABLE 2

| Octets: 2 | Bits: 0 | 1-15 | Octets: 2 |
|---|---|---|---|
| Ranging Block Index | Hopping Mode | Round Index | Transmission Offset |

The ranging block index field may designate the index of the ranging block, and the hopping mode field may designate a hop mode regarding the ranging block (e.g., 0 means no hopping, and 1 means hopping).

The round index field may designate a ranging round index regarding the ranging block, and the transmission offset field may designate a transmission offset value of the ranging round in the ranging block. The transmission offset field may correspond to a value obtained by subtracting a packet duration from a ranging slot duration.

The RCM transmitted in the RCP may include a RDM IE. The RDM IE may allocate a ranging slot and a device role (for example, initiator or responder) in the ranging round.

In the case of time-scheduled ranging, a controller may use the RDM IE to select participating ranging devices, to designate the role of a corresponding device to be an initiator or a responder, and to allocate a time slot of the corresponding device.

The RDM IE may be configured in a content field format as in Table 3. For example, the RDM IE may include an SIU field (SIU), an address size field, an RDM list length field, and an RDM list field

TABLE 3

| Bits: 0 | 1 | 2-7 | Octets: variable |
|---|---|---|---|
| SIU | Address Size | RDM List Length | RDM List |

The SIU field may indicate whether a slot index field of an RDM list element is used (e.g., if the SIU field is 1, the slot index field is used).

The address size field may designate the size of an address used in the RDM list field. For example, if the address size field is "0", all addresses of the RDM list element may be short addresses, and if the address size is "1", all addresses may be extended addresses.

The RDM list length field may indicate the number of elements in the RDM list field.

The RDM list field may be configured in an element format as in Table 4. For example, the RDM list field may include a ranging role field, a ranging slot index field, and an address field.

TABLE 4

| Bits: 0 | 1-7 | Octets: 2/8 |
|---|---|---|
| Ranging Role | Ranging Slot Index | Address |

The ranging role field may designate whether a selected device is an initiator or a responder. The ranging slot index field may be used to allocate a slot index to the device when a slot index field of an RDM list element is used (for example, when SIU field is "1").

The address field may be used to identify each participating device. The size of the address field may be designated by an address size field within the RDM IE.

Figure 8:
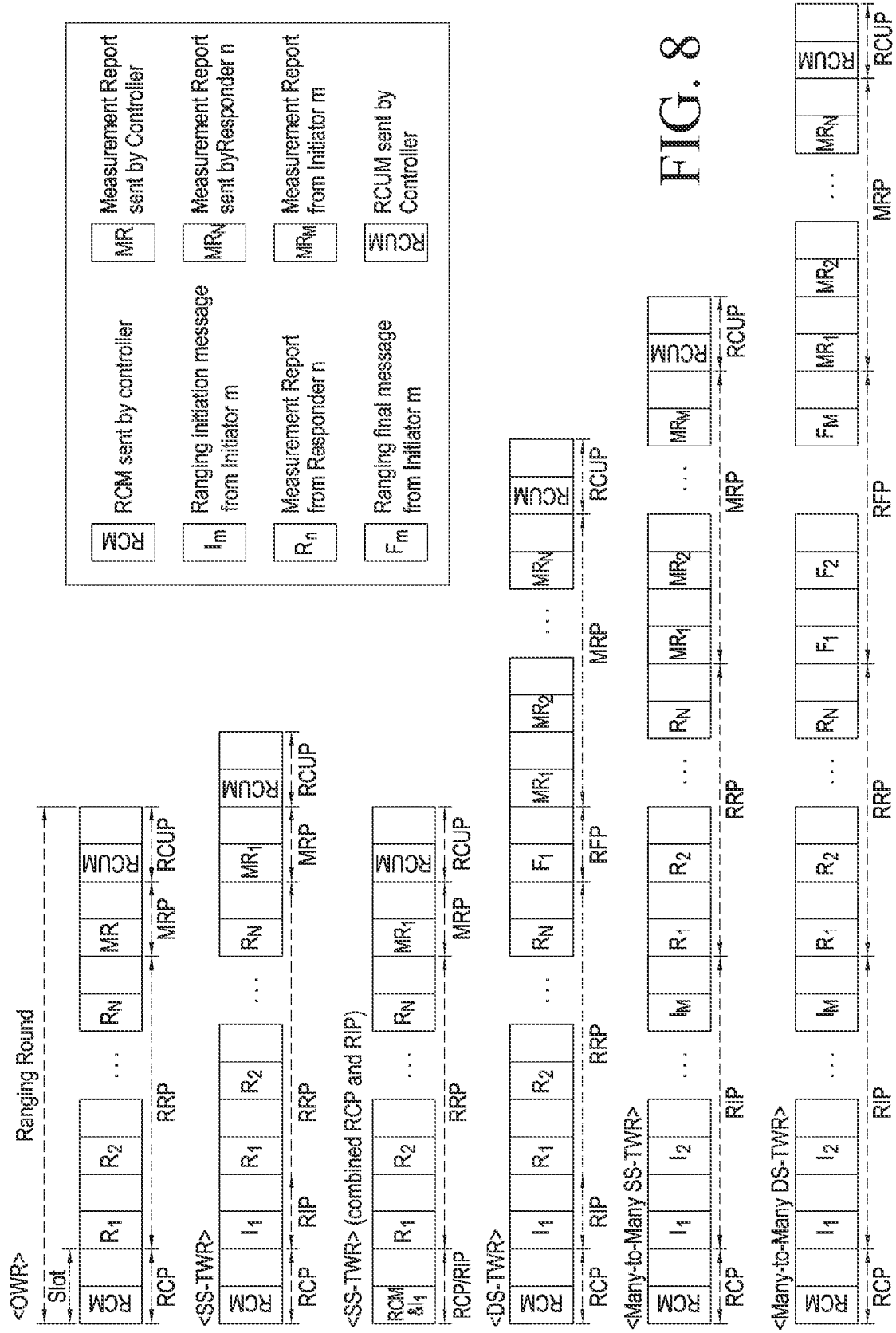
FIG. 8 illustrates ranging message exchange procedures according to ranging schemes, according to an embodiment of the disclosure.

FIG. 8 illustrates ranging message exchange procedures according to ranging schemes, according to an embodiment of the disclosure.

The embodiments in FIG. 8 illustrate operations of exchanging messages for ranging in a ranging cycle (ranging round) according to ranging schemes (types). The used ranging scheme (type) may be indicated by an RCM. The RCM may be transmitted in the first slot of the corresponding ranging round.

<OWR>

Referring to FIG. 8, a ranging procedure using an OWR scheme (OWR procedure) may include at least one phase for ranging message exchange. The OWR procedure may include an RCP, an RIP, an RRP, an RFP, an RP, and/or a ranging control update phase (RCUP). Descriptions of respective phases are as follows:

RCP: a phase in which a controller device transmits a ranging control message (RCM). The RCM of the OWR procedure may also be referred to as a poll message.

RIP: a phase in which initiator device(s) transmit a ranging initiation message (RIM) to responder device(s).

RRP: a phase in which responder device(s) transmit a ranging response message (RRM) to the initiator device.

MRP: a phase in which devices participating ranging exchange ranging measurement and relevant service information through a measurement report (MR).

RCUP: a phase in which the controller device transmits a ranging control update message (RCUM). If exists, the RCUP may be the last slot of a set of ranging rounds designated by the RCM.

<SS-TWR>

Referring to FIG. 8, a ranging procedure using a TWR scheme (TWR procedure) may include at least one phase for ranging message exchange.

Referring to FIG. 8, the TWR procedure may include an RCP, a RIP, an RRP, a MRP, and/or an RCUP. RCP: a phase in which a controller device transmits a RCM.

RIP: a phase in which initiator device(s) transmit a RIM to responder device(s).

RRP: a phase in which responder device(s) transmit a RRM to the initiator device.

MRP: a phase in which devices participating ranging exchange ranging measurement and relevant service information through a measurement report (MR).

RCUP: a phase in which the controller device transmits a RCUM. If exists, the RCUP may be the last slot of a set of ranging rounds designated by the RCM.

Phases including the RIP and the RRP may be referred to as an RP.

As shown in FIG. 8, in the SS-TWR procedure, the RCP and the RIP may be combined into a single phase. For example, when a single electronic device performs both the role of an initiator device and the role of a controller device, the RCP and the RIP may be combined into a single phase. In this case, in the combined phase, a single ranging message including all information included in the RCM and the RIM may be transmitted.

<DS-TWR>

Referring to FIG. 8, a ranging procedure using a TWR scheme (TWR procedure) may include at least one phase for ranging message exchange.

Referring to FIG. 8, the TWR procedure may include an RCP, an RIP, an RRP, an RFP, an MRP, and/or an RCUP. Descriptions of respective phases are as follows:

RCP: a phase in which a controller device transmits a RCM.

RIP: a phase in which initiator device(s) transmit a RIM to responder device(s).

RRP: a phase in which responder device(s) transmit a RRM to the initiator device.

RFP: a phase in which the initiator device transmits a RFM to responder device(s).

MRP: a phase in which devices participating ranging exchange ranging measurement and relevant service information through a MR.

RCUP: a phase in which the controller device transmits a RCUM. If exists, the RCUP may be the last slot of a set of ranging rounds designated by the RCM.

Phases including the RIP, RRP, and RFP may be referred to as an RP.

In the DS-TWR procedure, the RCP and the RIP may be combined into a single phase. For example, when a single electronic device performs both the role of an initiator device and the role of a controller device, the RCP and the RIP may be combined into a single phase. In this case, in the combined phase, a single ranging message including all information included in the RCM and the RIM may be transmitted.

<Many-to-Many SS-TWR/Many-to Many DS-TWR>

Referring to FIG. 8, SS-TWR and DS-TWR may be performed between multiple initiators and multiple responders. In this case, the RIP may include ranging slots, the number of which corresponds to that of multiple initiators, for the sake of transmission of an RIM by multiple initiators. Scheduling of a ranging slot used by each initiator to transmit its RIM in the RIP may be indicated by an RCM.

Figure 9:
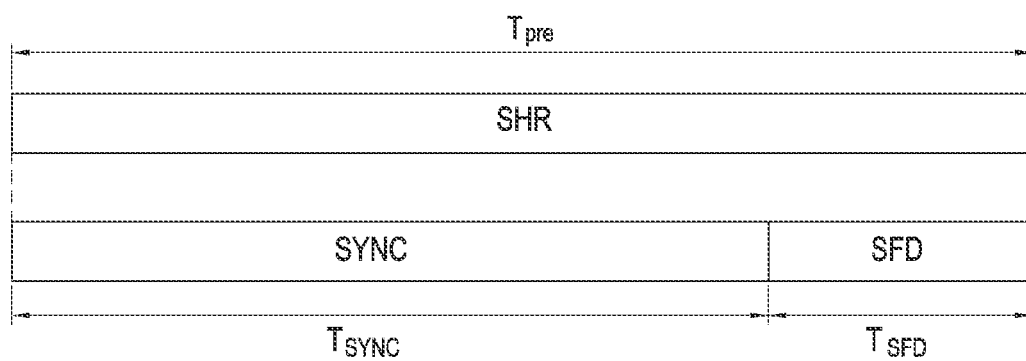
FIG. 9 illustrates the structure of a synchronization header (SHR) used for UWB ranging, according to an embodiment of the disclosure.

FIG. 9 is a diagram illustrating the structure of an SHR used for UWB ranging, according to an embodiment of the disclosure.

The SHR illustrated in FIG. 9 may be identical or substantially identical to the SHR illustrated in FIG. 5A. The SYNC field and SFD illustrated in FIG. 9 may be identical or substantially identical to the SYNC field and SFD illustrated in FIG. 5B.

Referring to FIG. 9, the period of time during which the SHR is transmitted may be configured as $T_{pre}$, the period of time during which the SYNC filed is transmitted may be configured as $T_{SYNC}$, and the period of time during which the SFD filed is transmitted may be configured as $T_{SFD}$.

The SYNC field is configured as a code known between UWB devices (known code), and may be used to synchronize the reception timepoints of UWB devices. The SYNC field may be configured based on a ternary code. Each channel may use a different code when configuring the SYNC field, and a different code index may be assigned to each code.

The SYNC field may include length 31 ternary codes as in Table 5. For example, a different code index may be assigned to each code sequence, and a UWB channel number may be preconfigured for each code sequence.

TABLE 5

| Code index | Code sequence | Channel number[a] |
|---|---|---|
| 1 | − 0 0 0 0 + 0 − 0 + + + 0 + − 0 0 0 + − + + + 0 0 − + 0 − 0 0 | 0, 1, 8, 12 |
| 2 | 0 + 0 + − 0 + 0 + 0 0 0 − + + 0 − + − − − 0 0 + 0 0 + + 0 0 0 | 0, 1, 8, 12 |
| 3 | − + 0 + + 0 0 0 − + − + + 0 0 + + 0 + 0 0 − 0 0 0 0 − 0 + 0 − | 2, 5, 9, 13 |
| 4 | 0 0 0 0 + − 0 0 − 0 0 − + + + + 0 + − + 0 0 0 + 0 − 0 + + 0 − | 2, 5, 9, 13 |
| 5 | − 0 + − 0 0 + + + − + 0 0 0 − + 0 + + + 0 − 0 + 0 0 0 0 − 0 0 | 3, 6, 10, 14 |
| 6 | + + 0 0 + 0 0 − − − + − 0 + + − 0 0 0 + 0 + 0 − + 0 + 0 0 0 0 | 3, 6, 10, 14 |
| 7 | + 0 0 0 0 + − 0 + 0 + 0 0 + 0 0 0 + 0 + + − − − 0 − + 0 0 − + | 4, 7, 11, 15 |
| 8 | 0 + 0 0 − 0 − 0 + + 0 0 0 0 − − + 0 0 − + 0 + + − + + 0 + 0 0 | 4, 7, 11, 15 |

The SYNC field may include length 127 ternary codes as in Table 6.

TABLE 6

| Code index | Code sequence | Channel number[a] |
|---|---|---|
| 9 | + 0 0 + 0 0 0 − 0 − − 0 0 − − + 0 + 0 + 0 0 − + − + + 0 + 0 0 0 0 + + − 0 0 0 + 0 0 − 0 0 − − 0 − + 0 + 0 − − 0 − + + + 0 + + 0 0 0 + − 0 + 0 0 − 0 + + − 0 + + + 0 0 − + 0 0 + 0 + 0 − 0 + + − + − − + 0 0 0 0 0 0 + 0 0 0 0 0 − + 0 0 0 0 − 0 − 0 0 0 − − + | 0-3, 5, 6, 8-10, 12-14 |
| 10 | + + 0 0 + 0 − + 0 0 + 0 0 + 0 0 0 0 0 0 − 0 0 0 − 0 0 − − 0 0 0 − 0 + − + 0 − 0 + − 0 − + 0 0 0 0 0 + − 0 0 + + 0 − 0 + 0 0 − − + 0 0 + + − + 0 + − 0 + 0 0 0 0 − 0 − 0 − + + − + 0 + 0 + 0 + 0 0 0 − + 0 + + + 0 0 0 − − − − + + + 0 0 0 0 + + + 0 − − | 0-3, 5, 6, 8-10, 12-14 |
| 11 | − + − 0 0 0 0 + 0 0 − − 0 0 0 0 0 − 0 + 0 + 0 + − 0 + 0 0 + 0 0 + 0 − 0 0 − + + + 0 0 + 0 0 0 − + 0 + 0 − 0 0 0 0 + + + + + + − + 0 + − − 0 + + − − 0 − 0 0 0 + 0 − + 0 0 + 0 + − − − − 0 0 0 − 0 0 0 0 0 0 − + 0 0 + − 0 + + 0 0 0 + + − 0 0 + + − 0 − 0 | 0-3, 5, 6, 8-10, 12-14 |
| 12 | − + 0 + + 0 0 0 0 0 0 − 0 + 0 − + 0 − − − + − + + 0 0 − + 0 + + 0 + 0 + 0 + 0 0 0 − 0 0 − 0 0 − + 0 0 + − − + + 0 0 0 − + − 0 − + + 0 − 0 + + + + 0 − 0 0 − 0 + + 0 0 + 0 + 0 0 + + − 0 0 + 0 0 0 + − 0 0 0 − 0 − − + 0 0 0 0 − 0 0 0 0 − − 0 + 0 0 0 0 0 + − − | 0-3, 5, 6, 8-10, 12-14 |
| 13 | + 0 0 0 − − 0 0 0 0 − − + + 0 − + + + + 0 − 0 + + 0 + 0 − 0 0 − + 0 + + 0 0 + + − 0 + + 0 + − + 0 − 0 0 + 0 0 − 0 − − − 0 0 0 − + − 0 0 + 0 0 0 0 − 0 + + − 0 0 0 0 0 + − 0 − 0 0 0 0 0 0 − 0 0 − + − + + − + 0 0 0 − 0 + 0 + 0 + + + − − 0 0 + 0 + 0 0 0 | 0-15; DPS only |
| 14 | + 0 0 0 + + 0 − 0 + 0 − 0 0 + − 0 − + 0 − 0 0 + 0 + 0 0 0 0 + 0 + − 0 0 0 0 + + 0 0 + 0 + + + + + − + 0 − 0 + − 0 − − + 0 + + − − 0 0 0 − − − 0 + 0 0 0 + 0 + 0 − + − 0 0 0 0 0 0 + − + − 0 − − 0 0 + + 0 0 0 − 0 0 + 0 0 + + − 0 0 − − + + − 0 0 − 0 0 0 0 0 | 0-15; DPS only |

UWB devices configured to perform ranging occupy ranging slots and transmit UWB packets, and only one UWB device may be able to transmit packets with regard to each ranging slot. However, if only one UWB device may be able to transmit packets with regard to each ranging slot, the UWB device that receives the packets needs to secure a long RX time, and this may increase power consumption.

UWB has a very short transmission time compared with other wireless communication technologies, and thus has a low level of TX power consumption but has a large amount of RX power consumption. Considering the characteristics of electronic devices using multiple wireless communication technologies, RX power consumption may be a burden when operating UWB, and there is thus a need for a scheme for reducing power consumption by minimizing/optimizing the RX time.

A method is provided in which multiple UWB devices transmit multiple packets in a single ranging slot in order to reduce power consumption by minimizing/optimizing the RX time of each UWB device.

Multiple UWB devices may transmit multiple packets in a single ranging slot through a time division scheme, a code division scheme, or an STS parallel transmission scheme.

Herein, the time division refers to a scheme in which multiple UWB devices transmit packets at different timepoints (that is, by using mini slots) in a single ranging slot. The code division refers to a scheme in which multiple UWB devices transmit packets through different codes in a single ranging slot. The STS parallel transmission refers to a scheme in which multiple UWB devices transmit packets through different STSs (STSs configured by different codes) in a single ranging slot.

Time division is described in greater detail below in FIG. 10A, code division is described in greater detail below in FIG. 11A, and STS parallel transmission is described in greater detail below in FIG. 12.

It may be preconfigured whether to apply time division or code division to each of multiple UWB devices such that multiple UWB devices transmit multiple packets in a single ranging slot.

Transmission control information transmitted through a narrowband or UWB (e.g., RCM) may include an indicator for selecting time division or code division. For example, in the case of a one-bit indicator, time division may be configured if the indicator is "1", and code division may be configured if the indicator is "0".

When multiple UWB devices have been allocated to a single ranging slot, time division or code division may be configured according to the transmission offset field value included in the RR IE in Table 1. For example, when multiple UWB devices have been allocated to a single ranging slot, and when the transmission offset field value included in the RR IE is "0", code division may be configured. For example, when multiple UWB devices have been allocated to a single ranging slot, and when the transmission offset field value included in the RR IE is "1", time division may be configured.

Figure 10A:
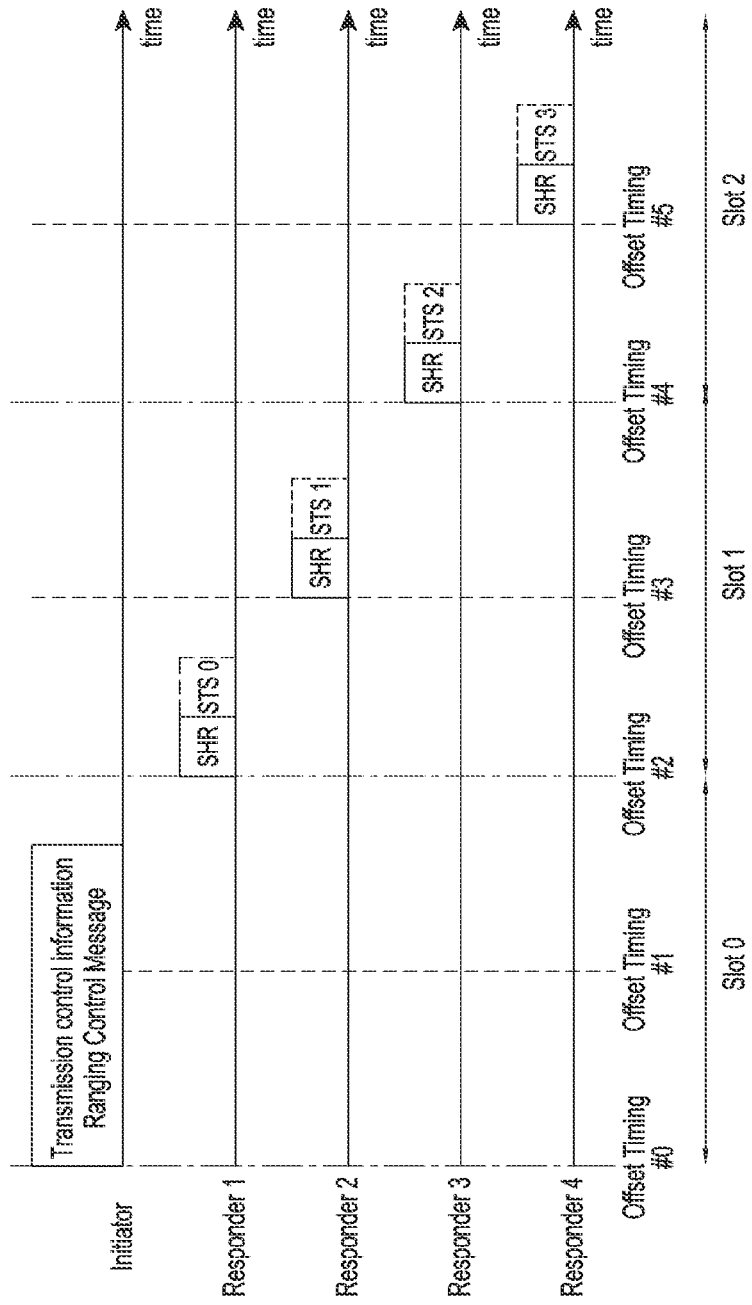
FIG. 10A illustrates a method in which a UWB device transmits packets, according to an embodiment of the disclosure.

FIG. 10A illustrates a method in which a UWB device transmits packets, according to an embodiment of the disclosure.

In FIG. 10A, the first UWB device may perform the role of an initiator, the second UWB device may perform the role of a first responder, the third UWB device may perform the role of a second responder, the fourth UWB device may perform the role of a third responder, and the fifth UWB device may perform the role of a fourth responder.

Although the first UWB device is illustrated in FIG. 10A as performing the role of an initiator that transmits control information (e.g., the first UWB device performs the role of a controller and an initiator), the first UWB device may perform the role of a controller that transmits control information, and another UWB device perform the role of an initiator that transmits a ranging initiation message.

Although five UWB devices are illustrated in FIG. 10A as performing the role of initiators/responders for convenience of description, the technical idea of the disclosure is not limited thereto, and the number of UWB devices performing the role of initiators or responders may be variously implemented.

Referring to FIG. 10A, a single ranging round may include a first slot (slot 0), a second slot (slot 1), and a third slot (slot 2). The first UWB device (initiator) may transmit transmission control information (for example, UWB RCM) through a UWB or narrowband at the starting timepoint of the first slot (slot 0). The transmission offset of the transmission control information (e.g., UWB RCM) may be configured as "Offset Timing #0".

In response to the transmission control information (e.g., UWB RCM), the second UWB device (responder 1) may transmit a packet including an SHR or a first SP3 type (in the case of SP configuration 3) packet (SHR+STS0) at the starting timepoint of the second slot (slot 1). The transmission offset of the packet including an SHR or the first SP3 type packet may be configured as "Offset Timing #2" in the second slot (slot 1).

The first SP3 type packet may include an SHR and a first ciphering sequence (STS0). The first SP3 type packet may be a ranging response message transmitted in the RP in FIG. 7.

In response to the transmission control information (e.g., UWB RCM), the third UWB device (responder 2) may transmit a packet including an SHR or a second SP3 type packet (SHR+STS1) at an intermediate timepoint of the second slot (slot 1). The transmission offset of the packet including an SHR or the second SP3 type packet may be configured as "Offset Timing #3" in the second slot (slot 1).

The second SP3 type packet may include an SHR and a second ciphering sequence (STS1). The second SP3 type packet may be configured to include a different STS from the first SP3 type packet. The second SP3 type packet may be a ranging response message transmitted in the RP in FIG. 7.

Each of the second UWB device (responder 1) and the third UWB device (responder 2) may transmit a packet including an SHR or an SP3 type packet by varying the transmission offset in the second slot (slot 1). The transmission offset may be configured by the transmission offset field within the RR IE in Table 1.

In response to the transmission control information (e.g., UWB RCM), the fourth UWB device (responder 3) may transmit a packet including an SHR or a third SP3 type packet (preamble+STS2) at the starting timepoint of the third slot (slot 2). The transmission offset of the packet including an SHR or the third SP3 type packet may be configured as "Offset Timing #4" in the third slot (slot 2).

The third SP3 type packet may include a preamble and a third ciphering sequence (STS2). The third SP3 type packet may be the ranging response message transmitted in the RP in FIG. 7.

In response to the transmission control information (e.g., UWB RCM), the fifth UWB device (responder 4) may transmit a packet including an SHR or a fourth SP3 type packet (preamble+STS3) at an intermediate timepoint of the third slot (slot 2). The transmission offset of the packet including an SHR or the fourth SP3 type packet may be configured as "Offset Timing #5" in the third slot (slot 2).

The fourth SP3 type packet may include an SHR and a fourth ciphering sequence (STS3). The fourth SP3 type packet may be the ranging response message transmitted in the RP in FIG. 7.

Each of the fourth UWB device (responder 3) and the fifth UWB device (responder 4) may transmit a packet including an SHR or an SP3 type packet by varying the transmission offset in the third slot (slot 2). The transmission offset may be configured by the transmission offset field within the RR IE in Table 1.

The length of mini slots in the ranging slot may be differently configured according to the transmission offset value in the RR IE in Table 1. If a transmission offset value in the RR IE is configured as various numbers, the number of mini slots included in the ranging slots may also be variously implemented.

FIG. 10B illustrates an RDM list field inside an RDM IE, according to an embodiment of the disclosure.

The RDM list field illustrated in FIG. 10B may include a ranging role field, a ranging slot index field, and an address field identically to the RDM list field in Table 3. Detailed descriptions of respective fields inside the RDM list field have been made with reference to Table 3, and will not be repeated herein.

Referring to FIG. 10B, the RDM list field may allocate multiple UWB devices and multiple device addresses with regard to a single ranging slot index. The number of UWB devices or device addresses may be configured to be less than the number of mini slots in the ranging slot.

UWB devices allocated to the same ranging slot index in the RDM list field may be allocated to respective mini slots according to the order included in the RDM list.

Referring to FIG. 10A and FIG. 10B, an identical ranging slot index (slot 1) may be allocated to the second UWB device (responder 1) and the third UWB device (responder 2), a first address (address of responder 1) may be allocated to the second UWB device (responder 1), and a second address (address of responder 2) may be allocated to the third UWB device (responder 2).

The second UWB device (responder 1) and the third UWB device (responder 2) allocated to an identical ranging slot index (slot 1) may transmit packets according to the order included in the RDM list. For example, the second UWB device (responder 1) may transmit a first packet in the ranging slot index (slot 1), and the third UWB device (responder 2) may transmit a second packet in the ranging slot index (slot 1).

Figure 11A:
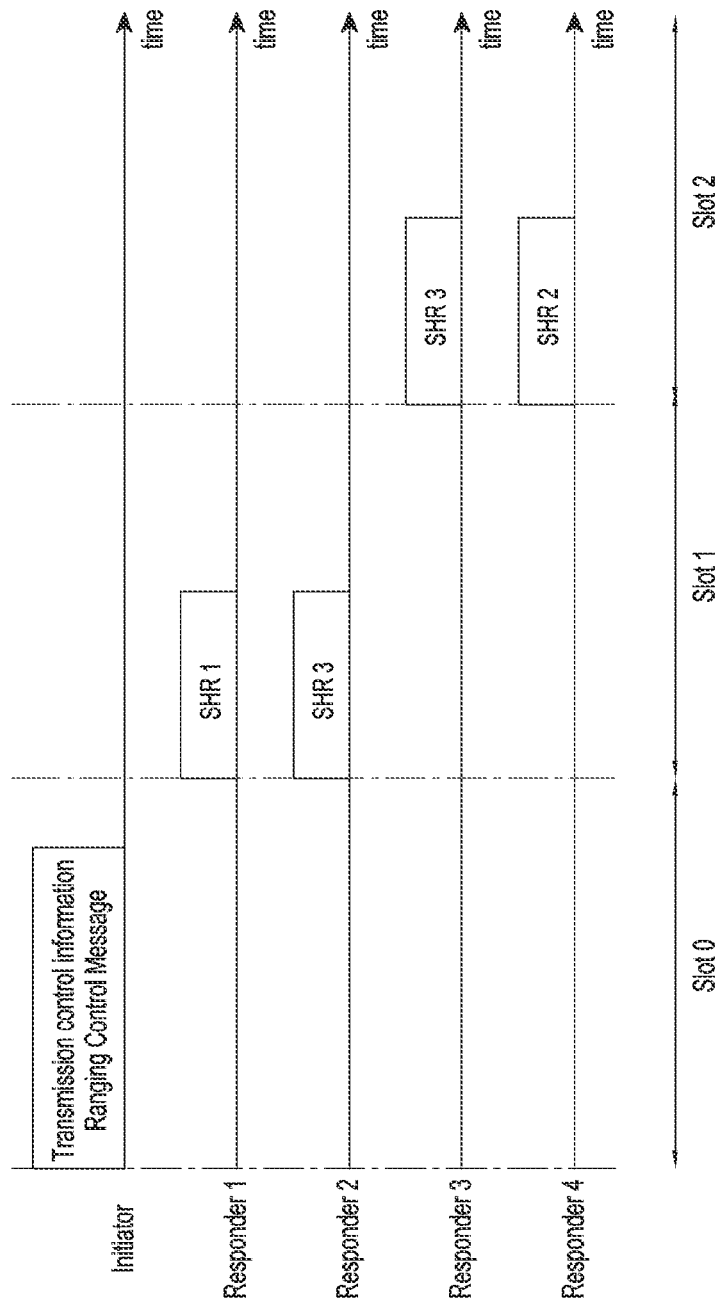
FIG. 11A illustrates a method in which a UWB device transmits packets, according to an embodiment of the disclosure.

FIG. 11A illustrates a method in which a UWB device transmits packets, according to an embodiment of the disclosure.

In FIG. 11A, the first UWB device may perform the role of an initiator, the second UWB device may perform the role of a first responder, the third UWB device may perform the role of a second responder, the fourth UWB device may perform the role of a third responder, and the fifth UWB device may perform the role of a fourth responder.

Although the first UWB device is illustrated in FIG. 11A as performing the role of an initiator that transmits control information (that is, the first UWB device performs the role of a controller and an initiator), the first UWB device may perform the role of a controller that transmits control information, and another UWB device may perform the role of an initiator that transmits a ranging initiation message.

Although five UWB devices are illustrated in FIG. 11A as performing the role of initiators/responders for convenience of description, the technical idea of the disclosure is not limited thereto, and the number of UWB devices performing the role of initiators or responders may be variously implemented.

Referring to FIG. 11A, a single ranging round may include a first slot (slot 0), a second slot (slot 1), and a third slot (slot 2). The first UWB device (initiator) may transmit transmission control information (e.g., UWB ranging control message (RCM)) through a UWB or narrowband at the starting timepoint of the first slot (slot 0).

The first UWB device (initiator) may allocate a ranging slot and a preamble to each of the second UWB device (responder 1) to the fifth UWB device (responder 4). Multiple responders can transmit in a single ranging slot, and the preamble may be transmitted orthogonally.

In response to transmission control information (e.g., UWB RCM), the second UWB device (responder 1) may transmit a packet including a first synchronization header (SHR1) at a preconfigured timepoint (e.g., starting timepoint) of the second slot (slot 1).

In response to transmission control information (e.g., UWB RCM), the third UWB device (responder 2) may transmit a packet including a third synchronization header (SHR3) at a preconfigured timepoint (e.g., starting timepoint) of the second slot (slot 1).

The second UWB device (responder 1) and the third UWB device (responder 2) may transmit packets by using differently configured synchronization headers (SHR) in the second slot (slot 1), respectively. The first synchronization header (SHR1) and the third synchronization header (SHR3) may be configured based on different codes (e.g., different ternary codes) in the SYNC field, respectively.

In response to transmission control information (e.g., UWB ranging control message (RCM)), the fourth UWB device (responder 3) may transmit a packet including a third synchronization header (SHR3) at a preconfigured timepoint (e.g., starting timepoint) of the third slot (slot 2).

In response to transmission control information (e.g., UWB ranging control message (RCM)), the fifth UWB device (responder 4) may transmit a packet including a second synchronization header (SHR2) at a preconfigured timepoint (for example, starting timepoint) of the third slot (slot 2).

The fourth UWB device (responder 3) and the fifth UWB device (responder 4) may transmit packets by using differently configured synchronization headers (SHR) in the third slot (slot 2), respectively. The second synchronization header (SHR2) and the third synchronization header (SHR3) may be configured based on different codes (e.g., different ternary codes) in the SYNC field, respectively.

FIG. 11B illustrates an RDM list field inside an RDM IE, according to an embodiment of the disclosure.

The RDM list field illustrated in FIG. 11B may include a ranging role field, a ranging slot index field, and an address field identically to the RDM list field in Table 3. Detailed descriptions of respective fields inside the RDM list field are described with reference to Table 3.

Referring to FIG. 11B, the RDM list field may allocate multiple UWB devices and multiple device addresses with regard to a single ranging slot index. The number of UWB devices or device addresses may be configured to be equal to or less than the total number of code indexes.

UWB devices allocated to the same ranging slot index in the RDM list field may be allocated to respective preconfigured code indexes according to the order included in the RDM list.

Referring to FIG. 11A and FIG. 11B, an identical ranging slot index (slot 1) may be allocated to the second UWB device (responder 1) and the third UWB device (responder 2), a first address (address of responder 1) may be allocated to the second UWB device (responder 1), and a second address (address of responder 2) may be allocated to the third UWB device (responder 2).

The second UWB device (responder 1) and the third UWB device (responder 2) allocated to an identical ranging slot index (slot 1) may transmit packets, based on a predetermined code index, according to the order included in the RDM list. For example, the second UWB device (responder 1) allocated firstly to a ranging slot index (slot 1) may transmit a packet based on "code index 3" in the SYNC field, and the third UWB device (responder 2) allocated secondly to the ranging slot index (slot 1) may transmit a packet based on "code index 4" in the SYNC field.

In the case of a scheme in which an SHR part is transmitted, a code index defined by standards may be utilized. For example, when the length 31 ternary code illustrated in Table 4 is utilized by channel number 9, code index 3 and code index 4 are available.

Figure 12:
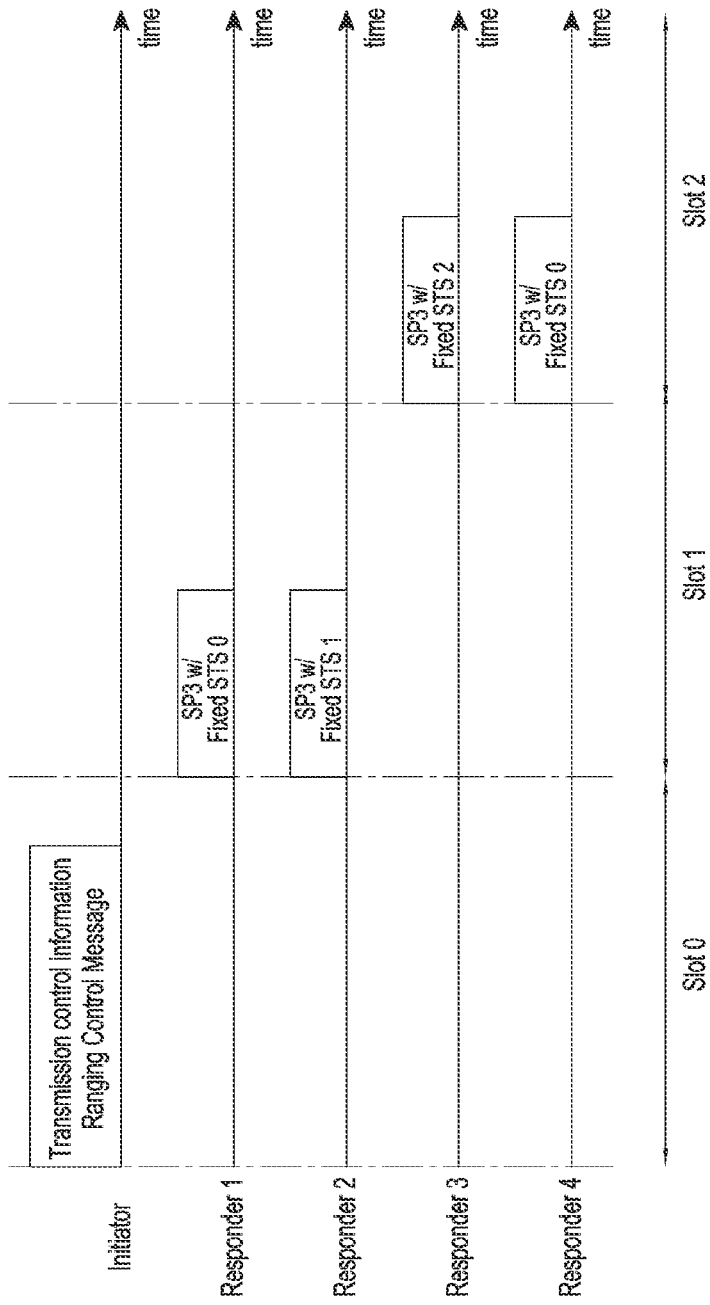
FIG. 12 illustrates a method in which a UWB device transmits packets, according to an embodiment of the disclosure.

FIG. 12 illustrates a method in which a UWB device transmits packets, according to an embodiment of the disclosure.

In FIG. 12, the first UWB device may perform the role of an initiator, the second UWB device may perform the role of a first responder, the third UWB device may perform the role of a second responder, the fourth UWB device may perform the role of a third responder, and the fifth UWB device may perform the role of a fourth responder.

Although five UWB devices are illustrated in FIG. 12 as performing the role of initiators/responders for convenience of description, the technical idea of the disclosure is not limited thereto, and the number of UWB devices performing the role of initiators or responders may be variously implemented.

Referring to FIG. 12, a single ranging round may include a first slot (slot 0), a second slot (slot 1), and a third slot (slot 2). The first UWB device (initiator) may transmit transmission control information (e.g., UWB RCM) through a UWB or narrowband at the starting timepoint of the first slot (slot 0).

The first UWB device (initiator) may allocate a ranging slot, to which an STS parallel transmission mode has been applied, to each of the second UWB device (responder 1) to the fifth UWB device (responder 4), and may transmit allocation information regarding the ranging slot to which the STS parallel transmission mode has been applied to each of the second UWB device (responder 1) to the fifth UWB device (responder 4).

Herein, the STS parallel transmission mode refers to a scheme in which multiple UWB devices transmit packets in a parallel manner through different STSs in a single ranging slot.

In the case of a scheduled scheme, a set of fixed STSs may be differently applied (or determined) according to a slot allocation order regarding respective UWB devices. A list of the set of fixed STSs may be shared between UWB devices in advance as in the case of the SYNC code list.

In the case of a contention scheme, a UWB device may select one from the set of fixed STSs and may transmit a packet in the ranging slot (collision occurs if the same STS is selected).

In response to transmission control information (e.g., UWB RCM), the second UWB device (responder 1) may transmit a first SP3 type (in the case of SP configuration 3) packet (SP3 with fixed STS0) including a fixed first STS (STS0) at a preconfigured timepoint (e.g., starting timepoint) of the second slot (slot 1).

In response to transmission control information (e.g., UWB RCM), the third UWB device (responder 2) may transmit a second SP3 type packet (SP3 with fixed STS1) including a fixed second STS (STS1) at a preconfigured timepoint (for example, starting timepoint) of the second slot (slot 1).

The second UWB device (responder 1) and the third UWB device (responder 2) may transmit SP3 type packets by using different fixed STSs in the second slot (slot 1), respectively. The second UWB device (responder 1) and the third UWB device (responder 2) may share information regarding fixed STSs, respectively, in advance.

In response to transmission control information (e.g., UWB RCM), the fourth UWB device (responder 3) may transmit a third SP3 type packet (SP3 with fixed STS2) including a fixed third STS (STS2) at a preconfigured timepoint (e.g., starting timepoint) of the third slot (slot 2).

In response to transmission control information (e.g., UWB RCM), the fifth UWB device (responder 4) may transmit a first SP3 type packet (SP3 with fixed STS0) including a fixed first STS (STS0) at a preconfigured timepoint (e.g., starting timepoint) of the third slot (slot 2).

The fourth UWB device (responder 3) and the fifth UWB device (responder 4) may transmit SP3 type packets by using different fixed STSs in the third slot (slot 2), respectively. The fourth UWB device (responder 3) and the fifth UWB device (responder 4) may share information regarding fixed STSs, respectively, in advance.

The first STS (STS0) to the third STS (STS2) may be configured by using different STS codes, respectively. Indexes may be assigned with regard to different STS codes, respectively, and the STS codes may be configured to be used only between specific UWB devices. Predefined STS codes may be configured such that, even if simultaneously transmitted at the same timepoint, they can be received by respective UWB devices.

The RDM list field may allocate multiple UWB devices and multiple device addresses with regard to a single ranging slot index. The number of UWB devices or device addresses may be configured to be equal to or less than the total number of code indexes.

UWB devices allocated to an identical ranging slot index in the RDM list field may be allocated to STS code indexes, respectively, according to the order included in the RDM list.

Figure 13:
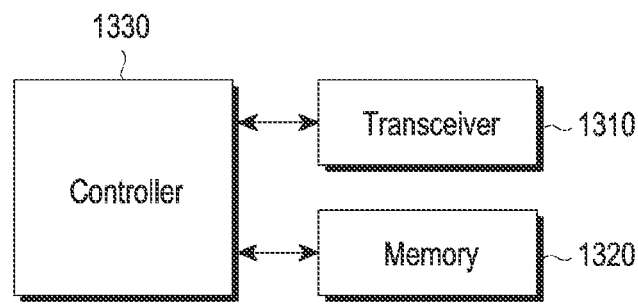
FIG. 13 illustrates the structure of a first UWB device, according to an embodiment of the disclosure.

FIG. 13 illustrates the structure of a first UWB device, according to an embodiment of the disclosure.

The first UWB device described with reference to FIG. 1 to FIG. 12 and FIG. 15A FIG. 18 may correspond to the electronic device 100 in FIG. 1, the first electronic device 210 in FIG. 2, the first electronic device 301 in FIG. 3, the initiator in FIG. 10A, the initiator in FIG. 11A, or the initiator in FIG. 12. Referring to FIG. 13, the proxy device may include a transceiver 1310, a memory 1320, and a controller 1330.

According to the communication method of the first UWB device described above, the transceiver 1310, the controller 1330, and the memory 1320 of the first UWB device may operate. However, components of the first UWB device are not limited to the above-described example. For example, the first UWB device may include more components or less components than the above-described components. Moreover, the transceiver 1310, the controller 1330, and the memory 1320 may be implemented as a single chip. In addition, the controller 1330 may include at least one processor.

The transceiver 1310 refers to a combination of the receiver of the first UWB device and the transmitter of the first UWB device, and may transmit/receive signals with other devices. To this end, the transceiver 1310 may include an RF transmitter configured to up/convert and amplify frequencies of transmitted signals, an RF receiver configured to low-noise-amplify received signals and to down-convert frequencies, and the like. However, this is only an embodiment of the transceiver 1310, and components of the transceiver 1310 are not limited to the RF transmitter and the RF receiver.

In addition, the transceiver 1310 may receive signals through a radio channel, may output the same to the controller 1330, and may transmit signals output from the controller 1330 through the radio channel.

The memory 1320 may store programs and data necessary for operations of the first UWB device. In addition, the memory 1320 may store control information or data included in signals acquired by the first UWB device. The memory 1320 may include a storage medium such as a read only memory (ROM), a random access memory (RAM), a hard disk, a compact disc-ROM (CD-ROM), and a digital versatile disc (DVD), or a combination of such storage media. In addition, the memory 1320 may not exist separately and may be included in the controller 1330.

The controller 1330 may control a series of operations such that the first UWB device can operate according to an embodiment described above.

The controller 1330 may control a ranging control message for UWB communication to be transmitted in the first slot inside a ranging round. The controller 1330 may control the second UWB device so as to receive a first packet transmitted in the second slot inside the ranging round, based on the ranging control message, and may control the third UWB device so as to receive a second packet transmitted in the second slot inside the ranging round, based on the ranging control message.

The first packet may include an SHR, and the timepoint at which the first packet is transmitted in the second slot may be configured based on a first offset included in the ranging control message. The second packet may include an SHR, and the timepoint at which the second packet is transmitted in the second slot may be configured based on a second offset included in the ranging control message.

The first packet may be configured as a first SP3 type packet being SP configuration 3, and the timepoint at which the first packet is transmitted in the second slot may be configured based on a first offset included in the ranging control message. The second packet may be configured as a second SP3 type packet being SP configuration 3, and the timepoint at which the second packet is transmitted in the second slot may be configured based on a second offset included in the ranging control message.

The first SP3 type packet may include an SHR and a first STS, and the second SP3 type packet may include a synchronization header and a second STS.

If the second UWB device and the third UWB device are allocated to an identical slot index corresponding to the second slot in the RDM list field included in the ranging control message, the transmission order of the second UWB device and the third UWB device in the second slot may be determined according to the order included in the RDM list.

The first packet may include a first synchronization header, the second packet may include a second synchronization header, and the first and second synchronization headers may be configured based on different codes, respectively.

If the second UWB device and the third UWB device are allocated to an identical slot index corresponding to the second slot in the RDM list field included in the ranging control message, the code of the synchronization header of the second UWB device and the third UWB device in the second slot may be determined according to the order included in the RDM list.

The first packet may be configured as a first SP3 type packet being SP configuration 3, and the second packet may be configured as a second SP3 type packet being SP configuration 3. The first SP3 type packet and the second PS3 type packet may be configured based on different codes, respectively.

Figure 14:
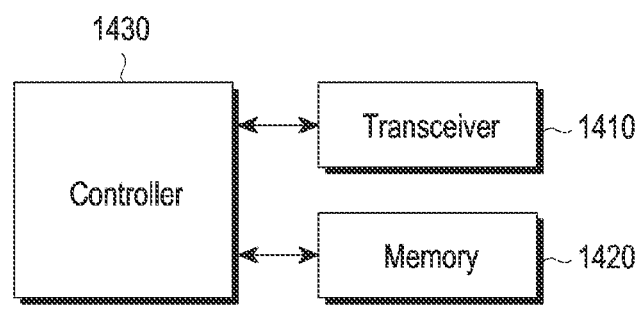
FIG. 14 illustrates the structure of a second UWB device according to an embodiment of the disclosure.

FIG. 14 illustrates the structure of a second UWB device, according to an embodiment of the disclosure.

The second UWB device described with reference to FIG. 1 to FIG. 12 and FIG. 15A FIG. 18 may correspond to the electronic device 100 in FIG. 1, the second electronic device 220 in FIG. 2, the second electronic device 302 in FIG. 3, the responder in FIG. 10A (e.g., one of responder 1 to responder 4), the responder in FIG. 11A (e.g., one of responder 1 to responder 4), or the responder in FIG. 12 (e.g., one of responder 1 to responder 4). Referring to FIG. 14, the second UWB device may include a transceiver 1410, a memory 1420, and a controller 1430.

According to the communication method of the gate device described above, the transceiver 1410, the controller 1430, and the memory 1420 of the second UWB device may operate. However, components of the second UWB device are not limited to the above-described example. For example, the second UWB device may include more components or less components than the above-described components. Moreover, the transceiver 1410, the controller 1430, and the memory 1420 may be implemented as a single chip. In addition, the controller 1430 may include at least one processor.

The transceiver 1410 refers to a combination of the receiver of the second UWB device and the transmitter of the second UWB device, and may transmit/receive signals with other devices. To this end, the transceiver 1410 may include an RF transmitter configured to up/convert and amplify frequencies of transmitted signals, an RF receiver configured to low-noise-amplify received signals and to down-convert frequencies, and the like. However, this is only an embodiment of the transceiver 1410, and components of the transceiver 1410 are not limited to the RF transmitter and the RF receiver.

In addition, the transceiver 1410 may receive signals through a radio channel, may output the same to the controller 1430, and may transmit signals output from the controller 1430 through the radio channel.

The memory 1420 may store programs and data necessary for operations of the second UWB device. In addition, the memory 1420 may store control information or data included in signals acquired by the second UWB device. The memory 1420 may include a storage medium such as a ROM, a RAM, a hard disk, a CD-ROM, and a DVD, or a combination of such storage media. In addition, the memory 1420 may not exist separately and may be included in the controller 1430.

The controller 1430 may control a series of operations such that the second UWB device can operate according to an embodiment of the disclosure described above.

The controller 1430 may control a ranging control message for UWB communication to be received from the first UWB device in the first slot inside a ranging round. The controller 1430 may control a first packet to be transmitted in the second slot inside the ranging round, based on the ranging control message. A second packet may be transmitted by the third UWB device, based on the ranging control message, in the second slot inside the ranging round.

The first packet may include an SHR, and the timepoint at which the first packet is transmitted in the second slot may be configured based on a first offset included in the ranging control message. The second packet may include an SHR, and the timepoint at which the second packet is transmitted in the second slot may be configured based on a second offset included in the ranging control message.

The first packet may be configured as a first SP3 type packet being SP configuration 3, and the timepoint at which the first packet is transmitted in the second slot may be configured based on a first offset included in the ranging control message. The second packet may be configured as a second SP3 type packet being SP configuration 3, and the timepoint at which the second packet is transmitted in the second slot may be configured based on a second offset included in the ranging control message.

The first packet may be configured as a first SP3 type packet being SP configuration 3, and the second packet may be configured as a second SP3 type packet being SP configuration 3. The first SP3 type packet and the second PS3 type packet may be configured based on different codes, respectively.

Figure 15A:
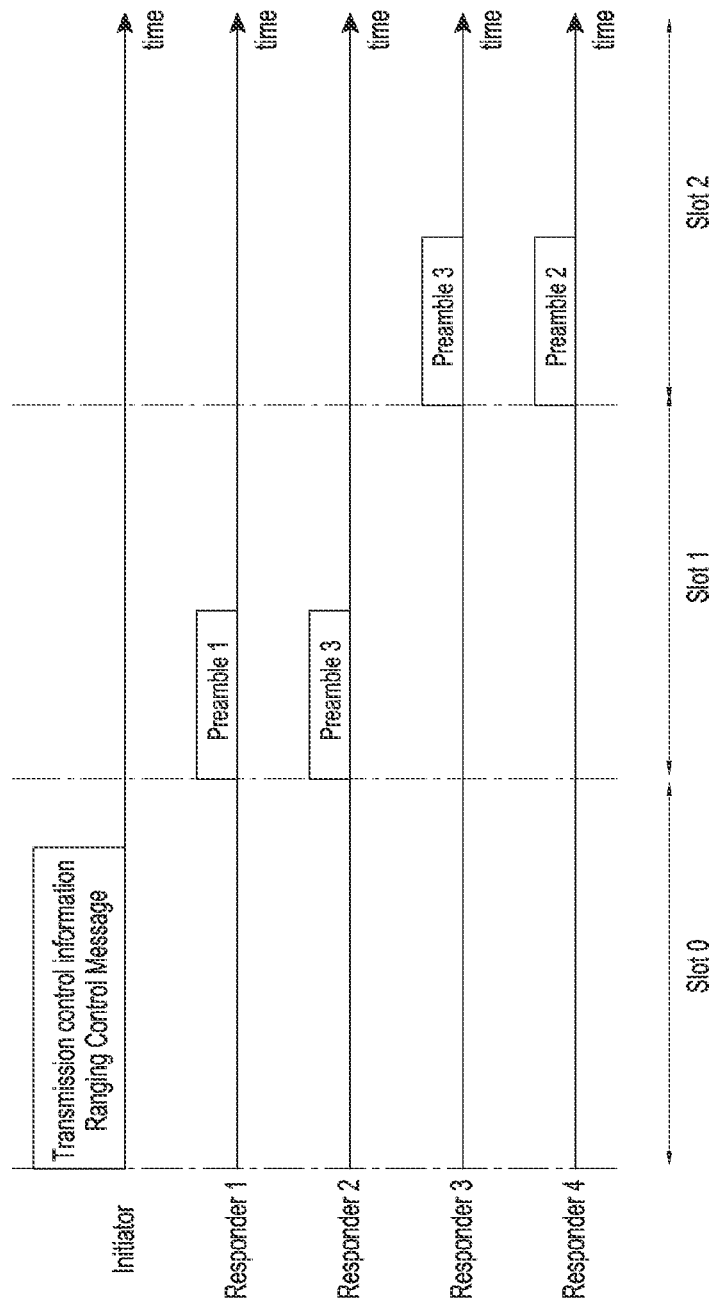
FIG. 15A illustrates a method in which a UWB device transmits packets, according to an embodiment of the disclosure.

FIG. 15A illustrates a method in which a UWB device transmits packets, according to an embodiment of the disclosure.

In FIG. 15A, the first UWB device may perform the role of an initiator, the second UWB device may perform the role of a first responder, the third UWB device may perform the role of a second responder, the fourth UWB device may perform the role of a third responder, and the fifth UWB device may perform the role of a fourth responder.

Although the first UWB device is illustrated in FIG. 15A as performing the role of an initiator that transmits control information (that is, the first UWB device performs the role of a controller and an initiator), the first UWB device may perform the role of a controller that transmits control information, and another UWB device perform the role of an initiator that transmits a ranging initiation message.

Although five UWB devices are illustrated in FIG. 15A as performing the role of initiators/responders for convenience of description, the technical idea of the disclosure is not limited thereto, and the number of UWB devices performing the role of initiators or responders may be variously implemented.

Referring to FIG. 15A, a single ranging round may include a first slot (slot 0), a second slot (slot 1), and a third slot (slot 2). The first UWB device (initiator) may transmit transmission control information (e.g., UWB ranging control message (RCM)) through a UWB or narrowband at the starting timepoint of the first slot (slot 0).

The first UWB device (initiator) may allocate a ranging slot and a preamble to each of the second UWB device (responder 1) to the fifth UWB device (responder 4). Multiple responders can transmit in a single ranging slot, and the preamble may be transmitted orthogonally.

The SHR may include a preamble (or SYNC field) and an SFD. The length and code of the preamble included in the SHR may be configured to be changeable, and the SFD included in the SHR may be configured as a fixed value. The UWB device may transmit only the preamble, excluding the SFD, in response to transmission control information (for example, UWB RCM).

In response to transmission control information (e.g., UWB RCM), the second UWB device (responder 1) may transmit a first preamble (preamble 1) at a preconfigured timepoint (e.g., starting timepoint) of the second slot (slot 1).

In response to transmission control information (e.g., UWB RCM), the third UWB device (responder 2) may transmit a third preamble (preamble 3) at a preconfigured timepoint (e.g., starting timepoint) of the second slot (slot 1).

The second UWB device (responder 1) and the third UWB device (responder 2) may transmit differently configured preambles (preamble 1) in the second slot (slot 1), respectively.

The first preamble (preamble 1) and the third preamble (preamble 3) may be configured based on different codes, respectively.

In response to transmission control information (e.g., UWB RCM), the fourth UWB device (responder 3) may transmit a third preamble (preamble 3) at a preconfigured timepoint (e.g., starting timepoint) of the third slot (slot 2).

In response to transmission control information (e.g., UWB RCM), the fifth UWB device (responder 4) may transmit a second preamble (preamble 2) at a preconfigured timepoint (e.g., starting timepoint) of the third slot (slot 2).

The fourth UWB device (responder 3) and the fifth UWB device (responder 4) may transmit differently configured preambles (preamble 1) in the third slot (slot 2), respectively. The second preamble (preamble 2) and the third preamble (preamble 3) may be configured based on different codes, respectively.

FIG. 15B illustrates an RDM list field inside an RDM IE, according to an embodiment of the disclosure.

The RDM list field illustrated in FIG. 15B may include a ranging role field, a ranging slot index field, and an address field identically to the RDM list field in Table 4. Detailed descriptions of respective fields inside the RDM list field are provided with reference to Table 4.

Referring to FIG. 15B, the RDM list field may allocate multiple UWB devices and multiple device addresses with regard to a single ranging slot index. The number of UWB devices or device addresses may be configured to be equal to or less than the total number of code indexes.

UWB devices allocated to the same ranging slot index in the RDM list field may be allocated to respective preconfigured code indexes according to the order included in the RDM list.

Referring to FIG. 15A and FIG. 15B, an identical ranging slot index (slot 1) may be allocated to the second UWB device (responder 1) and the third UWB device (responder 2), a first address (address of responder 1) may be allocated to the second UWB device (responder 1), and a second address (address of responder 2) may be allocated to the third UWB device (responder 2).

The second UWB device (responder 1) and the third UWB device (responder 2) allocated to an identical ranging slot index (slot 1) may transmit packets, based on a predetermined code index, according to the order included in the RDM list. For example, the second UWB device (responder 1) allocated firstly to a ranging slot index (slot 1) may transmit a packet based on "code index 3", and the third UWB device (responder 2) allocated secondly to the ranging slot index (slot 1) may transmit a packet based on "code index 4".

Figure 16A:
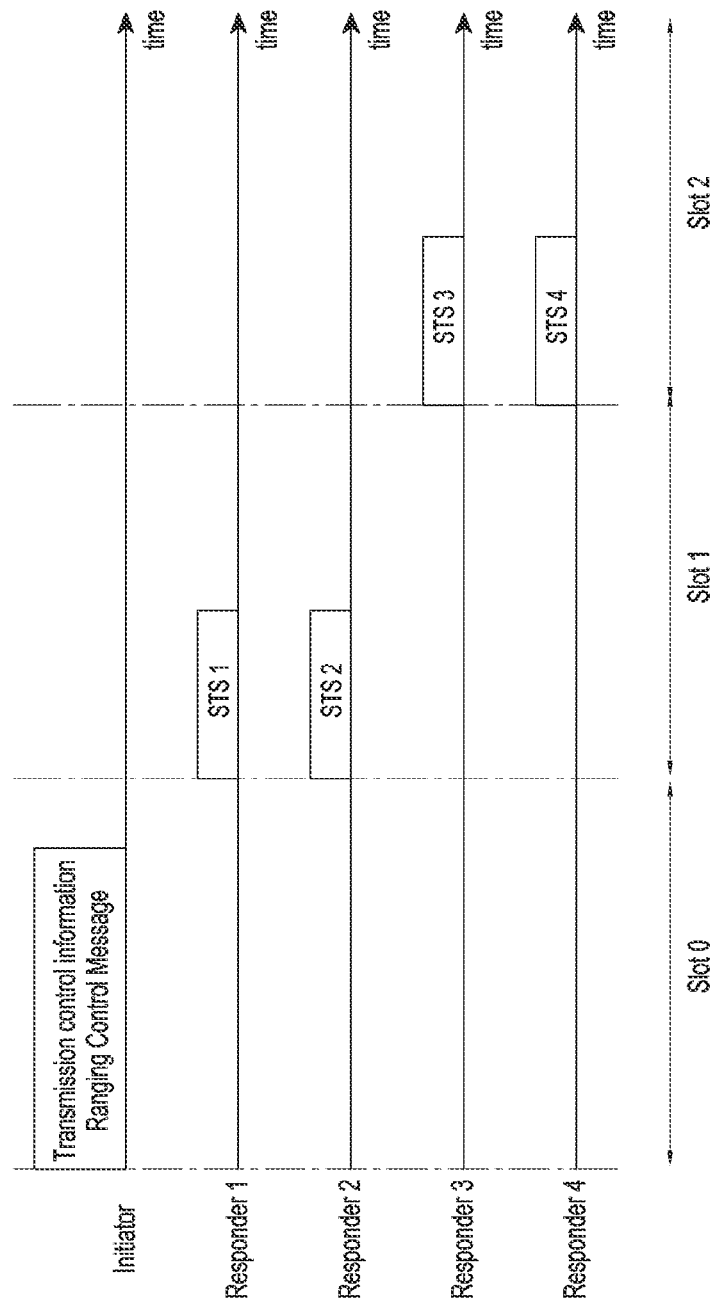
FIG. 16A illustrates a method in which a UWB device transmits packets, according to an embodiment of the disclosure.

FIG. 16A illustrates a method in which a UWB device transmits packets, according to an embodiment of the disclosure.

In FIG. 16A, the first UWB device may perform the role of an initiator, the second UWB device may perform the role of a first responder, the third UWB device may perform the role of a second responder, the fourth UWB device may perform the role of a third responder, and the fifth UWB device may perform the role of a fourth responder.

Although the first UWB device is illustrated in FIG. 16A as performing the role of an initiator that transmits control information (that is, the first UWB device performs the role of a controller and an initiator), the first UWB device may perform the role of a controller that transmits control information, and another UWB device perform the role of an initiator that transmits a ranging initiation message.

Although five UWB devices are illustrated in FIG. 16A as performing the role of initiators/responders for convenience of description, the technical idea of the disclosure is not limited thereto, and the number of UWB devices performing the role of initiators or responders may be variously implemented.

Referring to FIG. 16A, a single ranging round may include a first slot (slot 0), a second slot (slot 1), and a third slot (slot 2). The first UWB device (initiator) may transmit transmission control information (e.g., UWB RCM) through a UWB or narrowband at the starting timepoint of the first slot (slot 0).

The first UWB device (initiator) may allocate a ranging slot and a preamble to each of the second UWB device (responder 1) to the fifth UWB device (responder 4). Multiple responders can transmit in a single ranging slot, and the preamble may be transmitted orthogonally.

The UWB device may transmit only the STS, by excluding the SHR from an SP3 type packet (SHR+STS) being SP configuration 3, in response to transmission control information (e.g., UWB RCM). A set of fixed STSs may be differently applied (or determined) according to the slot allocation order regarding respective UWB devices. The UWB device may select one from a set of fixed STSs and may accordingly transmit a packet in the ranging slot. The UWB device may select one from a set of STSs generated by a method predefined between devices, and may accordingly transmit a packet in the ranging slot.

In response to transmission control information (e.g., UWB RCM), the second UWB device (responder 1) may transmit a first STS (STS1) at a preconfigured timepoint (e.g., starting timepoint) of the second slot (slot 1).

In response to transmission control information (e.g., UWB RCM), the third UWB device (responder 2) may transmit a second STS (STS2) at a preconfigured timepoint (e.g., starting timepoint) of the second slot (slot 1).

In response to transmission control information (e.g., UWB RCM), the fourth UWB device (responder 3) may transmit a third STS (STS3) at a preconfigured timepoint (e.g., starting timepoint) of the third slot (slot 2).

In response to transmission control information (e.g., UWB RCM), the fifth UWB device (responder 4) may transmit a fourth STS (STS4) at a preconfigured timepoint (e.g., starting timepoint) of the third slot (slot 2).

FIG. 16B is a diagram illustrating an RDM list field inside an RDM IE, according to an embodiment of the disclosure.

The RDM list field illustrated in FIG. 16B may include a ranging role field, a ranging slot index field, and an address field identically to the RDM list field in Table 4. Detailed descriptions of respective fields inside the RDM list field are provided with reference to Table 4.

Referring to FIG. 16B, the RDM list field may allocate multiple UWB devices and multiple device addresses with regard to a single ranging slot index. The number of UWB devices or device addresses may be configured to be equal to or less than the total number of code indexes.

UWB devices allocated to the same ranging slot index in the RDM list field may be allocated to respective preconfigured code indexes according to the order included in the RDM list.

Referring to FIG. 16A and FIG. 16B, an identical ranging slot index (slot 1) may be allocated to the second UWB device (responder 1) and the third UWB device (responder 2), a first address (address of responder 1) may be allocated to the second UWB device (responder 1), and a second address (address of responder 2) may be allocated to the third UWB device (responder 2).

The second UWB device (responder 1) and the third UWB device (responder 2) allocated to an identical ranging slot index (slot 1) may transmit packets, based on a predetermined STS index, according to the order included in the RDM list. For example, the second UWB device (responder 1) allocated firstly to a ranging slot index (slot 1) may transmit a packet based on "STS index 1", and the third UWB device (responder 2) allocated secondly to the ranging slot index (slot 1) may transmit a packet based on "STS index 2".

An identical ranging slot index (slot 2) may be allocated to the fourth UWB device (responder 3) and the fifth UWB device (responder 4), a third address (address of responder 3) may be allocated to the fourth UWB device (responder 3), and a fourth address (address of responder 4) may be allocated to the fifth UWB device (responder 4).

The fourth UWB device (responder 3) and the fifth UWB device (responder 4) allocated to an identical ranging slot index (slot 2) may transmit packets, based on a predetermined STS index, according to the order included in the RDM list. For example, the fourth UWB device (responder 3) allocated firstly to a ranging slot index (slot 2) may transmit a packet based on "STS index 3", and the fifth UWB device (responder 4) allocated secondly to the ranging slot index (slot 2) may transmit a packet based on "STS index 4".

The UWB device may select one from a set of STSs generated by a method predefined between devices, and may accordingly transmit a packet in a ranging slot. The UWB device may generate a set of STSs by utilizing DRGB defined in IEEE 802.15.4z, CCC Digital Key Phase 3 method, or an STS generating method defined in FiRa. The UWB device may generate a set of STSs by using a fixed STS key. The UWB device may generate a set of STSs, based on at least one of block index/round index/slot index.

FIG. 17A illustrates an STS set generated according to an embodiment of the disclosure.

Referring to FIG. 17A, the UWB device may generate an STS set according to a preconfigured index reference (for example, one of block index/round index/slot index).

For example, the STS set may be generated by selecting a first STS (STS 1) from index 1, selecting a second STS (STS 2) from index 2, selecting a third STS (STS 3) from index 3, and selecting a fourth STS (STS 4) from index 4.

FIG. 17B illustrates an STS set generated according to an embodiment of the disclosure.

Referring to FIG. 17B, the UWB device may generate an STS set according to a preconfigured index reference (e.g., combination of block index/round index/slot index).

For example, the STS set may be generated by selecting STS 1-1-1 when the block index is 1, the round index is 1, and the slot index is 1, and selecting STS 1-1-2 when the block index is 1, the round index is 1, and the slot index is 2. For example, the STS set may be generated by selecting STS 100-5-7 when the block index is 100, the round index is 5, and the slot index is 7, and selecting STS 1-1-2 when the block index is 1, the round index is 1, and the slot index is 2.

FIG. 17C illustrates an STS set generated according to an embodiment of the disclosure.

Referring to FIG. 17C, the UWB device may generate an STS set according to a preconfigured index reference (e.g., combination of block index/round index/slot index).

For example, the STS set may be generated by selecting STS 1-1-1-1 and/or STS 1-1-1-2 when the block index is 1, the round index is 1, and the slot index is 1, and selecting STS 1-1-2-1 and/or STS 1-1-2-2 when the block index is 1, the round index is 1, and the slot index is 2. For example, the STS set may be generated by selecting STS 100-5-7-1 and/or STS 100-5-7-2 when the block index is 100, the round index is 5, and the slot index is 7.

Figure 18:
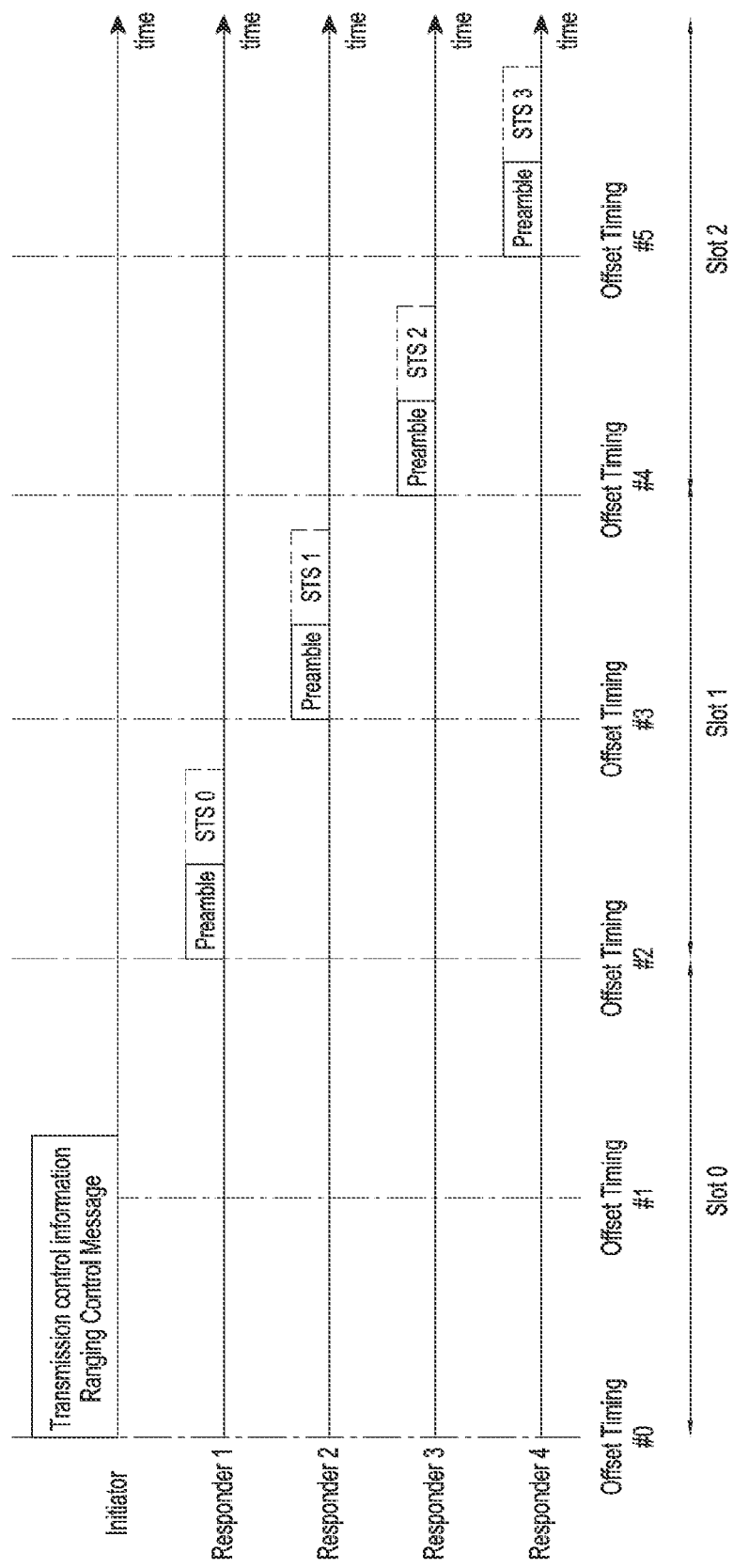
FIG. 18 illustrates a method in which a UWB device transmits packets, according to an embodiment of the disclosure.

FIG. 18 illustrates a method in which a UWB device transmits packets, according to an embodiment of the disclosure.

In FIG. 18, the first UWB device may perform the role of an initiator, the second UWB device may perform the role of a first responder, the third UWB device may perform the role of a second responder, the fourth UWB device may perform the role of a third responder, and the fifth UWB device may perform the role of a fourth responder.

Although the first UWB device is illustrated in FIG. 18 as performing the role of an initiator that transmits control information (i.e., the first UWB device performs the role of a controller and an initiator), the first UWB device may perform the role of a controller that transmits control information, and another UWB device perform the role of an initiator that transmits a ranging initiation message.

Although five UWB devices are illustrated in FIG. 18 as performing the role of initiators/responders for convenience of description, the technical idea of the disclosure is not limited thereto, and the number of UWB devices performing the role of initiators or responders may be variously implemented.

Referring to FIG. 18, a single ranging round may include a first slot (slot 0), a second slot (slot 1), and a third slot (slot 2). The first UWB device (initiator) may transmit transmission control information (e.g., UWB RCM) through a UWB or narrowband at the starting timepoint of the first slot (slot 0). The transmission offset of the transmission control information (e.g., UWB RCM) may be configured as "Offset Timing #0".

In response to the transmission control information (e.g., UWB RCM), the second UWB device (responder 1) may transmit a first packet (preamble+STS0) including a preamble and an STS at the starting timepoint of the second slot (slot 1). The transmission offset regarding the first packet (preamble+STS0) may be configured as "Offset Timing #2" in the second slot (slot 1).

In response to the transmission control information (e.g., UWB RCM), the third UWB device (responder 2) may transmit a second packet (preamble+STS1) including a preamble and an STS at an intermediate timepoint of the second slot (slot 1). The transmission offset regarding the second packet (preamble+STS1) may be configured as "Offset Timing #3" in the second slot (slot 1).

Each of the second UWB device (responder 1) and the third UWB device (responder 2) may transmit a packet including a preamble and an STS by varying the transmission offset in the second slot (slot 1). The transmission offset may be configured by the transmission offset field within the RR IE in Table 1.

In response to the transmission control information (e.g., UWB RCM), the fourth UWB device (responder 3) may transmit a third packet (preamble+STS2) including a preamble and an STS at the starting timepoint of the third slot (slot 2). The transmission offset regarding the third packet (preamble+STS2) may be configured as "Offset Timing #4" in the second slot (slot 1).

In response to the transmission control information (e.g., UWB RCM), the fifth UWB device (responder 4) may transmit a fourth packet (preamble+STS3) including a preamble and an STS at an intermediate timepoint of the third slot (slot 2). The transmission offset regarding the fourth packet (preamble+STS3) may be configured as "Offset Timing #5" in the second slot (slot 1).

Each of the fourth UWB device (responder 3) and the fifth UWB device (responder 4) may transmit a packet including a preamble and an STS by varying the transmission offset in the third slot (slot 2). The transmission offset may be configured by the transmission offset field within the RR IE in Table 1.

The length of mini slots in the ranging slot may be differently configured according to the transmission offset value in the RR IE in Table 1. If the transmission offset field value in the RR IE is configured as various numbers, the number of mini slots included in the ranging slots may also be variously implemented.

In the above-described detailed embodiments of the disclosure, an element included in the disclosure may be expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method by a first ultra-wideband (UWB) device, the method comprising:

transmitting, in a slot of control phase within a ranging round, a ranging control message for UWB communication;

receiving, from a second UWB device, a first packet in a slot of a ranging phase within the ranging round, wherein the slot of the ranging phase within the ranging round is allocated based on the ranging control message; and receiving, from a third UWB device, a second packet in the slot of the ranging phase within the ranging round.

2. The method of claim 1, wherein the ranging control message includes at least one of:

a slot index for the slot of the ranging phase within the ranging round;

sender address for identifying the first UWB device;

receiver address for identifying the second UWB device; or receiver address for identifying the third UWB device.

3. The method of claim 1, wherein:
the first packet is configured as a first SP3 type packet which is a scrambled timestamp sequence (STS) packet (SP) configuration 3,
a first timepoint to transmit the first packet in the slot of the ranging phase is configured based on a first offset included in the ranging control message,
the second packet is configured as a second SP3 type packet which is SP configuration 3, and
a second timepoint to transmit the second packet in the slot of the ranging phase is configured based on a second offset included in the ranging control message.

4. The method of claim 3, wherein the first SP3 type packet comprises a first synchronization header (SHR) and a first STS, and the second SP3 type packet comprises a second SHR and a second STS.

5. The method of claim 1, wherein, in case that the second UWB device and the third UWB device are allocated to an identical slot index corresponding to the slot of the ranging phase in a ranging device management (RDM) list included in the ranging control message, a transmission order for the second UWB device and the third UWB device in the slot of the ranging phase is determined according to an order included in the RDM list.

6. The method of claim 1, wherein the first packet comprises a first synchronization header (SHR), the second packet comprises a second SHR, and the first SHR and the second SHR are configured based on different codes.

7. The method of claim 6, wherein, in case that the second UWB device and the third UWB device are allocated to an identical slot index corresponding to the slot of the ranging phase in a ranging device management (RDM) list included in the ranging control message, SHR codes for the second UWB device and the third UWB device are determined according to an order included in the RDM list.

8. The method of claim 1, wherein:
the first packet is configured as a first SP3 type packet which is a scrambled timestamp sequence (STS) packet (SP) configuration 3,
wherein the second packet is configured as a second SP3 type packet which is being SP configuration 3, and
wherein the first SP3 type packet and the second SP3 type packet are configured based on different codes, respectively.

9. The method of claim 1, wherein the first packet includes a sequence of predetermined size, and the second packet includes a sequence of predetermined size.

10. The method of claim 1, wherein the ranging control message is used to indicate a code index allocated to the second UWB device, and
wherein the ranging control message is used to indicate a code index allocated to the third UWB device.

11. The method of claim 1, wherein the first packet comprises at least one of a first preamble and a first scrambled timestamp sequence (STS), and wherein the second packet comprises at least one of a second preamble and a second STS.

12. A method by a second ultra-wideband (UWB) device, the method comprising:
receiving, from a first UWB device, a ranging control message for UWB communication in a slot of control phase within a ranging round; and
transmitting a first packet in a slot of a ranging phase within the ranging round, wherein the slot of the ranging phase within the ranging round is allocated based on the ranging control message,
wherein a second packet is transmitted, by a third UWB, in the slot of the ranging phase within the ranging round.

13. The method of claim 12, wherein the ranging control message includes at least one of:
a slot index for the slot of the ranging phase within the ranging round;
sender address for identifying the first UWB device;
receiver address for identifying the second UWB device; or
receiver address for identifying the third UWB device.

14. The method of claim 12, wherein:
the first packet is configured as a first SP3 type packet which is a scrambled timestamp sequence (STS) packet (SP) configuration 3,
a first timepoint to transmit the first packet in the slot of the ranging phase is configured based on a first offset included in the ranging control message, the second packet is configured as a second SP3 type packet which is SP configuration 3, and
a second timepoint to transmit the second packet in the slot of the ranging phase is configured based on a second offset included in the ranging control message.

15. The method of claim 12, wherein:
the first packet is configured as a first SP3 type packet which is a scrambled timestamp p sequence (STS) packet (SP) configuration 3, wherein the second packet is configured as a second SP3 type packet which is SP configuration 3, and the first SP3 type packet and the second SP3 type packet are configured based on different codes, respectively.

16. The method of claim 12, wherein the first packet includes a sequence of predetermined size, and the second packet includes a sequence of predetermined size.

17. The method of claim 12, wherein the ranging control message is used to indicate a code index allocated to the second UWB device, and
wherein the ranging control message is used to indicate a code index allocated to the third UWB device.

18. The method of claim 12, wherein the first packet comprises at least one of a first preamble and a first scrambled timestamp sequence (STS), and wherein the second packet comprises at least one of a second preamble and a second STS.

19. A first ultra-wideband (UWB) device comprising:
a transceiver; and
a controller coupled with the transceiver and configured to control the transceiver to:
transmit, in a slot of control phase within a ranging round, a ranging control message for UWB communication,
receive, from a second UWB device, a first packet in a slot of a ranging phase within the ranging round, wherein the slot of the ranging phase within the ranging round is allocated based on the ranging control message, and
receive, from a third UWB device, a second packet in the slot of the ranging phase within the ranging round.

20. A second ultra-wideband (UWB) device comprising:
a transceiver; and
a controller coupled with the transceiver and configured to control the transceiver to:
receive, from a first UWB device, a ranging control message for UWB communication in a slot of control phase within a ranging round, and
transmit a first packet in a slot of a ranging phase within the ranging round, wherein the slot of the ranging phase within the ranging round is allocated based on the ranging control message, wherein a second packet is transmitted, by a third UWB device, in the slot of the ranging phase within the ranging round.

\* \* \* \* \*